(12) United States Patent
Holbert et al.

(10) Patent No.: US 8,247,063 B2
(45) Date of Patent: Aug. 21, 2012

(54) MULTILAYER MATERIAL AND RELATED METHODS

(75) Inventors: Victor P. Holbert, Newbury, OH (US); Randolph M. Parrish, Chardon, OH (US); Kevin O. Henderson, Willoughby Hills, OH (US); Ronald F. Sieloff, Chardon, OH (US)

(73) Assignee: Avery Dennison Corporation, Pasadena, CA (US)

( * ) Notice: Subject to any disclaimer, the term of this patent is extended or adjusted under 35 U.S.C. 154(b) by 180 days.

(21) Appl. No.: 12/867,288

(22) PCT Filed: Mar. 27, 2009

(86) PCT No.: PCT/US2009/038540
§ 371 (c)(1),
(2), (4) Date: Aug. 30, 2010

(87) PCT Pub. No.: WO2009/142825
PCT Pub. Date: Nov. 26, 2009

(65) Prior Publication Data
US 2011/0003096 A1    Jan. 6, 2011

Related U.S. Application Data

(60) Provisional application No. 61/039,944, filed on Mar. 27, 2008.

(51) Int. Cl.
*B41M 5/00* (2006.01)
*B44C 1/17* (2006.01)
*G03G 7/00* (2006.01)

(52) U.S. Cl. .............. 428/195.1; 428/203; 428/211.1; 428/213; 428/214; 428/220; 428/446; 428/500; 428/913.3

(58) Field of Classification Search ............... 428/195.1, 428/203, 211.1, 213, 214, 220, 446, 500, 428/913.3; 156/230; 427/243
See application file for complete search history.

(56) References Cited

U.S. PATENT DOCUMENTS
2003/0152732 A1* 8/2003 Donahue ................... 428/40.1
* cited by examiner

*Primary Examiner* — Betelhem Shewareged
(74) *Attorney, Agent, or Firm* — Avery Dennison Corporation

(57) ABSTRACT

A material and related methods that include a first layer and a second layer that is coupled to the first layer with the first layer disposed on the second layer, and an interface between the first layer and the second layer. The interface is configured to allow the first layer to be separated from the second layer. The first layer, after separation from the second layer, is configured to be repositioned and re-coupled to the second layer.

32 Claims, 8 Drawing Sheets

MULTILAYER MATERIAL AND RELATED METHODS

CROSS-REFERENCE TO RELATED APPLICATION

The present application claims the benefit of International Patent Application No. PCT/US2009/038540, which published in english on Nov. 26, 2009, and claims the benefit of U.S. Provisional Patent Application No. 61/039,944 filed Mar. 27, 2008, both of which are incorporated herein by reference in their entireties.

FIELD OF THE INVENTION

The present invention generally relates to multilayer materials. More specifically, the present invention relates to multilayer materials both pressure sensitive and non-pressure sensitive that are used in the packaging and/or protection of products, the production of labels and label materials, the provision of branding, information and/or other indicia or decoration on or in products or packaging, and related methods of manufacture and use.

BACKGROUND OF THE INVENTION

Currently, converters that are used to manufacture multilayer, i.e., two or more layers, laminated materials, e.g., flexible packaging substrates, durable films, and other products, frequently produce the multilayer laminated materials in two steps. In the first step, a first layer or ply of material is printed with information. Typically, the first layer is transparent, and the first layer is reverse printed. In the second step, the printed first layer is laminated onto a second layer or ply of material using adhesive lamination so that the surface of the first layer that includes the printing is adjacent to the second layer. Thus, the first layer's surface that includes the printing is protected from damage.

This manufacturing process disadvantageously utilizes two separate materials, i.e., the material for the first layer and the material for the second layer. In addition, the manufacturing process requires the use of adhesive lamination, which results in added costs for materials and inventory.

In other manufacturing processes, multilayer materials that are used for packaging are built layer upon layer during the manufacturing process. Finally, the top layer of the multilayer material is printed and over-laminated with a thin transparent film to seal and protect the printed information. This sort of manufacturing process that includes an over-lamination step requires the use of specific types of equipment that may be costly, or that some manufacturer may not have. Also, the over-lamination step is undesirable because it adds to the thickness to the construction, and introduces a film layer that alters the overall stiffness of multilayer material. Manufacturers of multilayer materials want to be able to protect the information that is printed on the multilayer material without having to add a secondary lamination step.

Accordingly, the existing multilayer laminated materials and their associated manufacturing processes are costly and inefficient in that they require a secondary lamination step and the use of adhesive in the lamination step. It should, therefore, be appreciated that there is a need for a multilayer laminated material and related methods that do not require a separate added lamination step, or do not require the use of an added laminating adhesive in the lamination step. The present invention satisfies these needs.

SUMMARY OF THE INVENTION

Multilayer materials and related methods that include only one pass of the material through a converting operation are advantageously provided. An exemplary embodiment is a multilayer material that includes a first layer and a second layer that is coupled to the first layer with the first layer disposed on the second layer, and an interface between the first layer and the second layer. The interface is configured to allow the first layer to be separated from the second layer. Accordingly, the first layer is configured to be separated from the second layer preferably along a designed line of separation formed by an interface between two adjacent material layers. The first layer, after separation from the second layer, is configured to be repositioned and re-coupled to the second layer.

In greater detail, a permanent bond is formed between the first layer and the second layer after the first layer is re-coupled to the second layer. Also, the first layer is light transmissive, translucent, transparent or at least partially transparent. Also, the first layer is printable and can have an exposed printable surface that can include: a printable polymer or polymer blend layer in the form of a monolayer film, a multilayer film or a coextruded core-skin film; or a polymer layer treated to provide improved print receptivity and anchorage by corona treatment, flame treatment or plasma treatment methods generally known to those skilled in this art; or can include a print coat or top coat layer of a print-receptive coating material disposed on or overlaying a layer of a transparent polymer film material. The printable top coat should not alter the light transmissive properties of the first layer.

In an embodiment, the print-receiving surface of the first layer can include a polyethylene polymer or copolymer, linear low density polyethylene ("LLDPE"), low density polyethylene, ultra-low density polyethylene, medium density polyethylene, high density polyethylene, metallocene catalyzed plastomer LLDPE, elastomer LLDPE, zinc or sodium neutralized ionomers, ethylene-vinyl acetate ("EVA") copolymers, ethylene-methacrylate ("EMA") copolymers, ethylene-acrylic acid ("EAA") copolymers, ethylene-methacrylic acid ("EMAA") copolymers, ethylene-vinyl alcohol ("EVOH") copolymers, propylene-ethylene copolymers, ethylene-propylene copolymers, maleic anhydride grafted polyolefins and olefinic copolymers, polymethyl methacrylate ("PMMA"), polyurethanes and mixtures or blends of any two or more of the foregoing polymers and copolymers.

Furthermore, the transparent material can be made of polyethylene terephthalate ("PET"), biaxially oriented polypropylene ("BOPP"), high density polyethylene ("HDPE"), low density polyethylene ("LDPE"), linear low density polyethylene ("LLDPE"), metallocene polyethylene ("mPE"), polystyrene, polycarbonate, polylactic acid ("PLA"), biaxially oriented nylon ("BON"), ethylene acrylic acid ("EAA"), ethylene vinyl acetate ("EVA"), ethylene methacrylates ("EMA"), cellulosics and other such materials known to those skilled in this art.

The print receiving layer if present as a separate layer or coating can have a thickness value of from about 0.1% to about 30% based on the total thickness of the overall construction. The layer of the transparent material can have a thickness value of from approximately 0.1% to approximately 30% based on the total thickness of the overall construction. Typical caliper or thickness for the transparent layer is from about 20 microns to about 300 microns. Also, the first layer can include a layer of transparent material that is inherently printable or can be rendered printable (by commercial printing processes) through the use of, for example, corona, flame or plasma treatment whereby the surface energy and composition of the first layer surface is modified during the treatment step. An example of an inherently printable transparent material can include, for instance, polyethylene terephthalate ("PET") film. An example of a transparent material that can be rendered printable through a corona, flame or plasma treatment can include, for instance, biaxially oriented polypropylene ("BOPP"). Other such transparent materials, either inherently printable or rendered printable through treatment, are well known by those ordinarily skilled in the art.

In an embodiment, the multilayer material includes a second layer and the second layer can have a multilayer construction including at least one sub-layer of a material that is made of film, foil, or paper; and the at least one sub-layer has a thickness of from approximately 5 microns to approximately 300 microns. The second layer can include at least two sub-layers of material that are coupled together using an adhesive. The sub-layer also can have a thickness value of about 1% to about 15% of the total thickness of the overall construction. Also, the multilayer material can further include a layer of adhesive that is coupled or disposed between the first layer and the second layer. The layer of adhesive can include a pressure-sensitive adhesive, for example, acrylic or rubber based hot melt adhesives, solvent acrylic adhesives, emulsion acrylic adhesives, silicone adhesives, urethane adhesives, heat and pressure sensitive adhesives, heat or light or UV or moisture activated adhesives, heat seal materials and generally can be selected from any adhesive or bonding material known to those skilled in the label and packaging arts. The layer of adhesive can have a thickness value from approximately 10 grams/square meter ("gsm") to approximately 50 gsm.

In an embodiment, the second layer includes a layer of foil or a layer of tie material. The multilayer material can further include a layer of a heat-sealable material that is coupled between the first layer and the second layer. The heat-sealable material can be ethylene acrylic acid ("EAA"), ionomers such as Surlyn® or Iotek™, ethylene vinyl acetate ("EVA"), ethylene methacrylic acid ("EMAA"), ethylene methacrylates ("EMA"), anhydride-modified linear low density polyethylene, and other such materials well known to those ordinarily skilled in the art. The layer of the heat-sealable material can have a thickness of from approximately 5 microns to approximately 50 microns. The adhesive or heat seal layers can have a thickness value of from about 1% to about 15% of the total thickness of the overall construction. In addition, the multilayer material can be a packaging material that is configured to be used for packaging an item, for example, food, snacks, medical goods and equipment, and other consumer and industrial goods and products.

Another exemplary embodiment is a multilayer material that includes a first layer having a first surface and an opposing second surface, and a second layer having a surface that is coupled to the first layer's second surface with the first layer disposed on the second layer, and an interface between the second layer's surface and the first layers' second surface. The interface is configured to allow the first layer to be separated from the second layer. If the first layer is separated from the second layer, the first layer is configured to be repositioned and re-coupled to the second layer so the first layer's first surface is coupled to the second layer's surface.

In a further embodiment, the overall construction has a first and second layer. The first layer may be comprised of at least two separate layers of material. A top film layer of the first layer would have a top surface which could be printed on and made of a first material and the bottom film layer would be of a material which would releaseably adhere to the second layer of the overall construction. This could be accomplished by extrusion lamination.

In particular, a coextruded film with a peel-able interface is an asymmetric film that has a weak mechanical bond with the extrudate between the film and the foil is provided. Ideally, the extrudate, applied during lamination, will have a strong bond to foil but will be incompatible to the bottom side of the first layer of film to which it is laminated. The additional function of the extrudate would be to bond with the print inks by means of heat and pressure applied through a nip at high line speeds (in excess of 150 fpm).

The composition for an asymmetric first layer of film for this process can be a co-extruded product with a printable polymeric outer surface and an opposing surface that is incompatible with the extrudate. Additionally, a film made entirely from a polymer that is incompatible with the extrudate can be single-side modified by printable coatings, chemical treatment or other surface enhancements.

For the first layer film, the extruded top layer, printable surface can include the following, either independently or in blends with each other: LLDPE (metallocene catalyzed or Ziegler-Natta), EVA, EMA, EAA, EMAA, Ionomers, EEA or ULDPE. These materials will either bond naturally to the opposing surface or require an extrudable adhesive bond or other natural bridge. Common extrudable adhesives include DuPont's Bynel® grades, Arkema's Lotader® grades, and LyondellBasell's Plexar® grades. The opposing bottom film layer of the first layer, which does not adhere well to the extrudate, can be any of the following: Acrylonitrile-Butadiene-Styrene (ABS), Polyester (PET), unmodified Polymethylmethacrylate (PMMA or acrylic), unmodified Polystyrene (PS), Homopolymer Polypropylene (HPP), Ethylene Vinyl Alcohol (EVOH), Styrene-Acrylonitrile (SAN), Methyl Pentene Copolymer (e.g. Mitsui's TPX®), Polycarbonate (PC), Styrene-Butadiene Copolymers (e.g. ChevronPhillip's K-Resin®), and any of the fluorocarbons (PTFE, EFE, ETCFE, etc).

The preferred polymers for extrusion laminated second layer are Ethylene Acrylic Acid (EAA), Ethylene-Methacrylic Acid Copolymers (EMAA) and Ethylene-Methacrylic Acid Salts (Ionomers). Trade examples are DuPont's Surlyn®, ExxonMobil's Iotek™, A. Schulman's Clarix, and Dow's Primacor® materials.

Instead of a coextruded film, commercially available single-side coated BOPP or single-side treated PET films may also work. This allows the opening of the above materials to also be modified on one surface to permit printing. The key function for this approach is that the printing inks will provide the bond between the film and the extrudate. In areas where the ink coverage is low or non-existent, there will not be a suitable bond.

Optionally, an adhesive can be present between the bottom layer of the first layer and the second layer which allowed for separation of the layers after reverse printing on the top surface of the top layer so that the first layer can be removed from the second layer after printing on the top surface of the first layer, flipped, and re-adhered to the second layer of material.

More particularly, in an embodiment, the first layer includes at least two layers, and the second layer includes at least two layers. Before the first layer is separated from the second layer, one layer of the first layer's at least two layers is separable from or incompatible with and coupled to one layer of the second layer's at least two layers. Also, one of the first layer's at least two layers is made of polypropylene ("PP"), ionomer such as Surlyn®, styrene butadiene styrene ("SBS"), ethylene vinyl acetate ("EVA"), metallocene catalyzed linear low density polyethylene ("mPE"), and one of the second layer's at least two layers is made of Nylon 6, 66, Nylon 6, polypropylene ("PP"), ethylene vinyl alcohol ("EVOH"), polyester such as polyethylene terephthalate-co-glycolate ("PETG") or polyethylene terephthalate ("PET"), Nylon 612, Nylon 610, polycarbonate or acrylic polymers and copolymers.

In an exemplary method for manufacturing a multilayer material, the method includes providing a first material that is configured into a first layer, providing a second material that is configured into a second layer, and coupling the first layer to the second layer to form the multilayer material with the first layer disposed on the second layer, and an interface between the first layer and the second layer. The interface is configured to allow the first layer to be separated from the second layer. If the first layer is separated from the second layer, the first layer is configured to be repositioned and re-coupled to the second layer.

Another exemplary method is a method for configuring a multilayer material that has a first layer coupled to a second layer. The first layer is disposed on the second layer. An interface is located between the first layer and the second layer. The interface is configured to allow the first layer to be separated from the second layer. The method includes providing the multilayer material, separating the first layer from the second layer, repositioning the first layer relative to the second layer, and re-coupling the first layer to the second layer.

In other embodiments, the method further includes printing information on the first layer before the first layer is separated from the second layer. Also, the step of repositioning the first layer relative to the second layer can include flipping or inverting the first layer. In addition, the step of repositioning the first layer relative to the second layer can be accomplished using a turn bar. Furthermore, the steps of separating the first layer from the second layer, repositioning the first layer relative to the second layer, and re-coupling the first layer to the second layer can be accomplished in a single pass using a conventional converting operations and equipment.

Other features of the invention should become apparent to those skilled in the art from the following description of the preferred embodiments taken in conjunction with the accompanying drawings, which illustrate, by way of example, the principles of the invention, the invention not being limited to any particular preferred embodiment(s) disclosed.

BRIEF DESCRIPTION OF THE DRAWINGS

These and other features, aspects, and advantages of the present invention will become better understood with reference to the following description, appended claims, and accompanying drawings, where:

Unless otherwise indicated, the illustrations in the above figures are not necessarily drawn to scale.

DETAILED DESCRIPTION OF THE INVENTION

Figure 1:
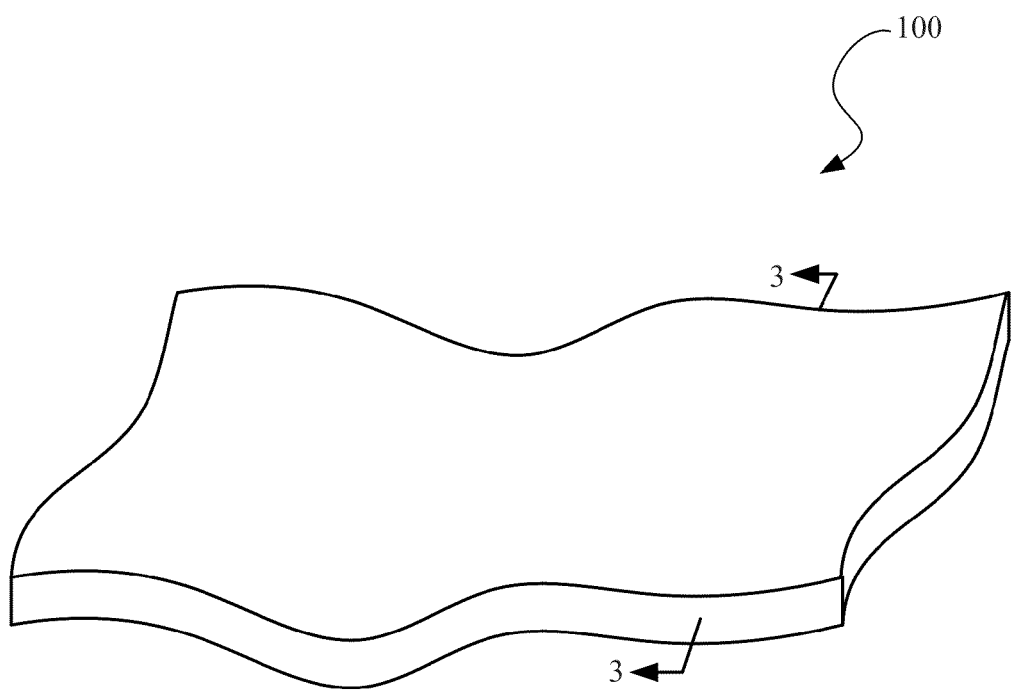
FIG. 1 is a perspective illustration of a sheet of multilayer material according to a preferred embodiment.
Figure 2:
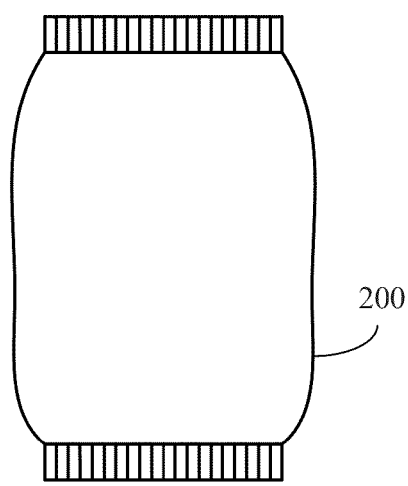
FIG. 2 is a side elevational view of a sealed bag formed from the sheet of multilayer material in FIG. 1.

Embodiments of the present invention are multilayer laminated materials that are used for the following: the packaging and/or protection of products, the creation of labels, the decoration of packages and products, and other associated uses. Specific embodiments of the multilayer laminated materials are used for flexible packaging, e.g., the packaging of food products, medical goods and equipment, and other consumer and industrial goods, as well as durable labels and beverage labels. Referring to FIGS. 1 and 2, there is shown a sheet of multilayer laminated material 100 that is used to form a bag 200 having sealed ends for storing food, e.g., snacks, candy, etc.

In an embodiment, the first and second layers of the multilayer material can comprise the same or different layers of materials conventionally used in label and/or flexible packaging constructions. In an embodiment the first layer includes a release surface and the second layer includes an adhesive surface that are disposed or assembled in a first orientation in opposing contacting relation so as to define an intended line of separation in the multilayer material. The release force of the first layer with respect to the second layer should be high enough to maintain the multilayer material as a handleable construction in ordinary web feeding and printing converting equipment. The release force should be sufficiently low that the first layer can be separated from the second layer along the intended line of separation in standard printing and converting equipment and operations, without distorting any of the printing or layers making up the first or second layers of the multilayer construction. Preferably the release force associated with a line of separation whether formed between a release surface and an adhesive or any of the other separable constructions described herein shall be between about 25 to about 100 grams per two inch, and also can be between 40 to 80 grams per two inch inclusive.

The thermoplastic polymer films useful in the film layers of the multilayer material can each have a single layer construction or a multilayer construction. The layer or layers of the films can be formed from a polymer chosen from polyester, polyolefin, polyvinyl chloride, polystyrene, polylactic acid, copolymers and blends thereof.

Polyolefins comprise homopolymers or copolymers of olefins that are aliphatic hydrocarbons having one or more carbon-to-carbon double bonds. Olefins include alkenes that comprise 1-alkenes, also known as alpha-olefins, such as 1-butene and internal alkenes having the carbon-to-carbon double bond on nonterminal carbon atoms of the carbon chain, such as 2-butene, cyclic olefins having one or more carbon-to-carbon double bonds, such as cyclohexene and norbornadiene, and cyclic polyenes, which are noncyclic aliphatic hydrocarbons having two or more carbon-to-carbon double bonds, such as 1,4-butadiene and isoprene. Polyolefins comprise alkene homopolymers from a single alkene monomer, such as a polypropylene homopolymer, alkene copolymers from at least one alkene monomer and one or more additional olefin monomers where the first listed alkene is the major constituent of the copolymer, such as a propylene-ethylene copolymer and a propylene-ethylene-butadiene copolymer, cyclic olefin homopolymers from a single cyclic olefin monomer, and cyclic olefin copolymers from at least one cyclic olefin monomer and one or more additional olefin monomers wherein the first listed cyclic olefin is the major constituent of the copolymer, and mixtures of any of the foregoing olefin polymers.

In one embodiment, the film is a multilayer film comprising a core layer and at least one skin layer. The skin layer can be a printable skin layer. In one embodiment, the multilayer shrink film comprises a core and two skin layers, wherein in at least one skin layer is printable.

In one embodiment, the film comprises a halogen-free, multilayer film comprising (a) a core layer comprising a copolymer of ethylene or propylene with an alpha olefin and the core having an upper and lower surface, (b) a skin layer on the upper surface of the core layer, wherein the skin layer comprises a polyolefin or polyolefin blend and (c) a printable layer on the lower surface of the core layer.

In one embodiment, the film comprises a halogen-free, multilayer film comprising (a) a core layer comprising a blend of (i) a copolymer of propylene with an alpha olefin and (ii) a homopolymer of propylene or butylene, or a copolymer of butylene with an alpha olefin, the core having an upper and lower surface; (b) a first skin layer on the upper surface of the core layer; and (c) a second skin layer on the lower surface of the core layer, wherein each skin layer independently comprises a copolymer of ethylene or butylene with an alpha olefin. In another embodiment, each of the skin layers, B and C, of the uniaxially oriented multilayered film comprises a blend of (i) a homopolymer of propylene or a homopolymer of butylene or a copolymer of butylene with an alpha olefin and (ii) a copolymer of propylene with an alpha olefin. Such multilayer films are described in U.S. Pat. No. 6,808,822, the disclosure of which is incorporated by reference herein in its entirety.

The film can be prepared by means known to those skilled in the art to include extrusion, coextrusion, lamination, coating, and combinations thereof as described in U.S. Pat. No. 6,808,822. In embodiments of the invention, the film is prepared by extrusion or coextrusion. The film can be nonoriented or oriented. The orientation can be uniaxial or biaxial. The uniaxially oriented film can be oriented in a machine direction or in a transverse direction. The extruded or coextruded film in several embodiments can be oriented by stretching it in the machine direction in a one stage or 2 stage stretching or drawing process wherein the draw or stretch ratio can be 1.1-9:1, 2-9:1, 3-7:1, 4-6:1, 1.1-3:1, or 1.1-2:1. The draw or stretching temperature can range from 90-140° C., or 100-135° C., or 105-130° C. In one embodiment, the film is oriented in the machine direction at a draw ratio of 4.6-5.4:1 and a draw temperature of 108-118° C. In another embodiment, the orientation is uniaxial in the machine direction only. In one embodiment of the invention, the film is oriented in the machine direction at a draw ratio of 5.5-6.5:1 and a draw temperature of 116-126° C., and in another embodiment the orientation is uniaxial in the machine direction only. In another embodiment of the invention, the stretched film can be annealed wherein the annealing temperature is below the stretching or drawing temperature as disclosed in U.S. Pat. No. 6,808,822.

The prepared film can be further treated on one surface or both the upper and lower surfaces to enhance performance in terms of printability or adhesion to an adhesive. The treatment can comprise applying a surface coating such as, for example, a lacquer, applying a high energy discharge to include a corona discharge to a surface, applying a flame treatment to a surface, or a combination of any of the foregoing treatments. In an embodiment of the invention, a coextruded film is treated on both surfaces, and in another embodiment a coextruded film is treated on one surface with a corona discharge and is flame treated on the other surface. In an embodiment a print coat or top coat is applied to the first layer film to improve printing characteristics. The printable topcoat composition usually comprises a binder and a filler.

The binder can be any film forming monomer, oligomer or polymer or combinations thereof. Examples of useful binders include polyurethanes, polyacryls, polyesters, polyamides, polyvinyl alcohols, polyvinyl pyrrolidinones, proteins, including gelatins, cellulosic resins including starches, vinyl acetate homopolymers and co- or terpolymers, styrene acryl copolymers, etc. Generally the binder is present in a major amount. Typically the binder composition is present in an amount from about 40% to about 90%, or from about 50% to about 85%, or from about 55% to about 75% by weight of the solids of the coating composition.

In one embodiment, the binder is a film-forming polymer, such as polyurethanes, polyacryls, polymethacryls, polyurethane-polyacryl mixtures, polyurethane-polymethacryl mixtures, urethane-acrylate or methacrylate copolymers, and mixtures thereof. As used herein, a "polyacryl" includes a polyacrylate, polyacrylic, or polyacrylamide. As used herein, a "polymethacryl" includes a polymethacrylate, polymethacrylic, or polymethacrylamide.

In one embodiment, the binder is a polyurethane. The polyurethane is typically the reaction products of the following components: (A) a polyisocyanate having at least two isocyanate (—NCO) functionalities per molecule with (B) at least one isocyanate reactive group such as a polyol having at least two hydroxy groups or an amine. Suitable polyisocyanates include diisocyanate monomers, and oligomers. Aliphatic polyisocyanates include 1,6-hexamethylene diisocyanate ("HMDI") and its isocyanurate-containing derivatives; cycloaliphatic polyisocyanates such as 4,4'-methylene bis (cyclohexyl isocyanate) ($H_{12}$ MDI), cyclohexane 1,4-diisocyanate and its isocyanurate derivatives; aromatic polyisocyanates such as 4,4'-diphenylmethane diisocyanate ("MDI"), xylene diisocyanate ("XDI"), toluene diisocyanate ("TDI"), isophorone diisocyanate ("IPDI"), 1,5-naphthalene diisocyanate ("NDI"), 4,4',4"-triphenylmethane diisocyanate, and their isocyanurate-containing derivatives. Mixtures or the reaction products of polyisocyanates can be used. Polyisocyanates contain the reaction products of these diisocyanate including isocyanurate, urea, allophanate, biuret, carbodiimide, and uretonimine entities.

Examples of polyisocyanates include ethylene diisocyanate, 1,4-tetramethylene diisocyanate, 1,6-hexamethylene diisocyanate ("HDI"), 1,12-dodecane diisocyanate, cyclobutane, 1,3-diisocyanate, 1-isocyanato-3,3,5-trimethyl-5-isocyanato methyl cyclohexane, bis(4-isocyanato cyclohexyl) methane, isophorone diisocyanate ("IPDI"), bis(4-isocyanatocyclohexo)methane; 4,4'-methylene-dicyclohexyl diisocyanate; 1,6-diisocyanato-2,2,4,4-tetramethylhexane; 1,6-diisocyanato-2,4,4-trimethylhexane; cyclohexane-1,4- diisocyanate; etc. Desmodur H from Miles Inc. is described as HDI having an NCO content of 50%, and Desmodur W from Miles Inc. is described as bis (4-isocyanato-cyclohexyl)methane containing 32% of NCO.

The polyol (B) can be selected from those commonly found in polyurethane manufacturing. They include hydroxy-containing or terminated polyesters, polyethers, polycarbonates, polythioethers, polyolefins, and polyesteramides. Suitable polyester polyols include hydroxy-terminated reaction products of ethylene glycol, propylene glycol, diethylene glycol, neopentyl glycol, 1,4-butanediol, furan dimethanol, polyether diols, or mixtures thereof, with dicarboxylic acids or their ester-forming derivatives. Polyesters obtained by the polymerization of lactones, such as caprolactone can also be used.

Polyether polyols useful for the polyurethane reaction include products obtained by the polymerization of a cyclic oxide including ethylene oxide, propylene oxide or tetrahydrofuran, or mixtures thereof. Polyether polyols include polyoxypropylene ("PPO") polyols, polyoxyethylene ("PEO") polyols, poly(oxyethylene-co-oxypropylene)polyols, polyoxytetramethylene ("PTMO") polyols.

Polycarbonate polyols useful for the polyurethane reaction include the products represented by the reaction products obtained by reacting diols such as 1,3-propanediol, 1,4-butanediol, 1,5-pentanediol, 1,6-hexanediol, diethylene glycol with diaryl carbonates such as diphenyl carbonate, or with phosgene, or with aliphatic carbonate, or with cycloaliphatic carbonate. Commercial polycarbonate diols include Duracarb 120 series aliphatic diols and Durocarb 140 series cylco aliphatic diols, both of PPG Industries, Pittsburgh, Pa.

In another embodiment, (B) the isocyanate reactive group can be of ionic, ionic precursor or nonionic type. The isocyanate-reactive group includes those compounds containing active hydrogen such as diols, polyols, diamines, and polyamines. The isocyanate reactive groups include anionic and cationic types. Anionic types include dihydroxy carboxylic acids such as alpha, alpha-dimethylolpropionic acid ("DMPA"), diamino carboxylic acids such as 1-carboxy, 1,5-diaminopentane, and 2-(aminoethyl)aminoethyl carboxylic acid; and sulfonate diamines. Anionic type of hydrophilic groups can be the ones that readily form the salts of sulpho, sulfate, thiosulphato, phospho, phosphono, phosphato, or carboxy groups. Examples for cationic type include tertiary amino groups or precursors, which readily form salts such as quaternary ammonium, quaternary phosphonium or ternary sulphonium salt groups.

Specific examples of the compounds containing ionic precursor groups and two or more isocyanate-reactive groups include triethanolamine, N-methyldiethanolamine and their oxyalkylation and polyeserification products, trimethylolpropane monophosphate and monosulphate, bis-hydroxylmethyl-phosphonic acid, diaminocarboxylic acids including lysine, cystine, 3,5-diamino benzoic acid, 2,6-dihydroxybenzoic acid, and dihydroxyalkanoic acids including 2,2-dimethylolpropionic acid.

Where a hydrophilic group is unreacted in preparing a polyurethane then a neutralizing compound for the hydrophilic group can be added to the reaction. Amines or ammonia such tertiary amines, such as triethylamine, triethanolamine or N-methylmorpholine, and diethyl amine or triethylamine, are effective in neutralizing carboxylic group and yields a neutralized anionic hydrophilic site on the polyurethane. In one embodiment, a chain extender that reacts with the excess or available isocyanate groups in the presence of aqueous medium and leads to a high molecular weight polyurethane aqueous dispersion. Suitable chain extenders for the further polymerization in aqueous medium are well known in the art. Selected examples include ethylene diamine, diethylene triamine, trietheylene tetraamine, propylene diamine, butylene diamine, hexamethylene diamine, cyclohexylene diamine, piperazine, tolylene diamine, xylylene diamine and isophorone diamine.

Useful polyurethanes include aromatic polyether polyurethanes, aliphatic polyether polyurethanes, aromatic polyester polyurethanes, aliphatic polyester polyurethanes, aromatic polycaprolactam polyurethanes, and aliphatic polycaprolactam polyurethanes. Particularly useful polyurethanes include aromatic polyether polyurethanes, aliphatic polyether polyurethanes, aromatic polyester polyurethanes, and aliphatic polyester polyurethanes.

Examples of commercial polyurethanes include Sancure® 2710 and/or Avalure® UR 445 (which are equivalent copolymers of polypropylene glycol, isophorone diisocyanate, and 2,2-dimethylolpropionic acid, having the International Nomenclature Cosmetic Ingredient name "PPG-17/PPG-34/IPDI/DMPA Copolymer"), Sancure® 878, Sancure® 815, Sancure® 1301, Sancure® 2715, Sancure® 1828, Sancure® 2026, Sancure® 1818, Sancure® 853, Sancure® 830, Sancure® 825, Sancure® 776, Sancure® 850, Sancure® 12140, Sancure® 12619, Sancure® 835, Sancure® 843, Sancure® 898, Sancure® 899, Sancure® 1511, Sancure® 1514, Sancure® 1517, Sancure® 1591, Sancure® 2255, Sancure® 2260, Sancure® 2310, Sancure® 2725, and Sancure® 12471 (all of which are commercially available from BFGoodrich, Cleveland, Ohio), Bayhydrol® DLN (commercially available from Bayer Corp., McMurray, Pa.), Bayhydrol® LS-2033 (Bayer Corp.), Bayhydrol® 123 (Bayer Corp.), Bayhydrol® PU402A (Bayer Corp.), Bayhydrol® 110 (Bayer Corp.), Witcobond® W-320 (commercially available from Witco Performance Chemicals), Witcobond® W-242 (Witco Performance Chemicals), Witcobond® W-160 (Witco Performance Chemicals), Witcobond® W-612 (Witco Performance Chemicals), Witcobond® W-506 (Witco Performance Chemicals), NeoRez® R-600 (a polytetramethylene ether urethane extended with isophorone diamine commercially available from Zeneca Resins), NeoRez® R-940 (Zeneca Resins), NeoRez® R-960 (Zeneca Resins), NeoRez® R-962 (Zeneca Resins), NeoRez® R-966 (Zeneca Resins), NeoRez® R-967 (Zeneca Resins), NeoRez® R-972 (Zeneca Resins), NeoRez® R-9409 (Zeneca Resins), NeoRez® R-9637 (Zeneca), NeoRez® R-9649 (Zeneca Resins), and NeoRez® R-9679 (Zeneca Resins).

Particularly useful polyurethanes are aliphatic polyether polyurethanes. Examples of such aliphatic polyether polyurethanes include Sancure® 2710 and/or Avalure® UR 445, Sancure® 878, NeoRez® R-600, NeoRez® R-966, NeoRez® R-967, and Witcobond® W-320.

In one embodiment, the binder is polyester polyurethane. Examples of these binders include those sold under the names Sancure® 2060 (polyester-polyurethane), Sancure® 2255 (polyester-polyurethane), Sancure® 815 (polyester-polyurethane), Sancure® 878 (polyether-polyurethane) and Sancure® 861 (polyether-polyurethane) by the company Sanncor, under the names NeoRez® R-974 (polyester-polyurethane), NeoRez® R-981 (polyester-polyurethane) and NeoRez® R-970 (polyether-polyurethane) by the company ICI, and the acrylic copolymer dispersion sold under the name NeoCryl® XK-90 by the company Zeneca.

In one embodiment, the binder can be an aliphatic urethane acrylate. These materials are oligomers, such as Ebecryl® 8806, having an average molecular weight of about 2,000 and a viscosity of about 10,500 centipoise, at 150° F. and manufactured and sold by Radcure Specialties, Inc. and Photomer® 6210 an aliphatic urethane acrylate oligomer having a molecular weight of about 1400, a viscosity of about 1500 centipoise at about 160° F. and manufactured and sold by Henkel Corporation.

In another embodiment, the binder is a polyacryl or polymethacryl resin. As used herein, a "polyacryl" includes polyacrylates, polyacrylics, or polyacrylamides, and "polymethacryl" includes polymethacrylates, polymethacrylics, or polymethacrylamides. These resins includes those derived from acrylic acid, acrylate esters, acrylamide, methacrylic acid, methacrylate esters, and methacrylamide. The acrylate and methacrylate ester generally contain from 1 to about 30 carbon atoms in the ester group, or from 1 to about 18, or from 2 to about 12 carbon atoms in the ester group.

Examples of commercial polyacryls and polymethacryls include Gelva® 2497 (commercially available from Monsanto Co., St. Louis, Mo.), DuraPlus® 2 (commercially available from Rohm & Haas Co., Philadelphia, Pa.), Joncryl® 95 (commercially available from S.C. Johnson Polymer, Sturtevant, Wis.), SCX-1537 (S. C. Johnson Polymer), SCX-1959 (S. C. Johnson Polymer), SCX-1965 (S. C. Johnson Polymer), Joncryl® 530 (S. C. Johnson Polymer), Joncryl® 537 (S. C. Johnson Polymer), Glascol® LS20 (commercially available from Allied Colloids, Suffolk, Va.), Glascol® C37 (Allied Colloids), Glascol® LS26 (Allied Colloids), Glascol® LS24 (Allied Colloids), Glascol® LE45 (Allied Colloids), Carboset® CR760 (commercially available from BFGoodrich, Cleveland, Ohio), Carboset® CR761 (BFGoodrich), Carboset® CR763 (BFGoodrich), Carboset® 765 (BFGoodrich), Carboset® 19X2 (BFGoodrich), Carboset® XL28 (BFGoodrich), Hycar® 26084 (BFGoodrich), Hycar® 26091 (BFGoodrich), Carbobond® 26373 (BFGoodrich), NeoCryl® A-601 (commercially available from Zeneca Resins, Wilmington, Mass.) NeoCryl® A-612 (Zeneca Resins), A-6044 (Zeneca Resins), NeoCryl® A-622 (Zeneca Resins), NeoCryl® A-623 (Zeneca Resins), NeoCryl® A-634 (Zeneca Resins), and NeoCryl® A-640 (Zeneca Resins).

In one embodiment, the binder is a combination of a polyurethane and a polyacryl. In this embodiment, the polyurethane is typically present in an amount of about 10% to about 90%, or from about 20% to about 80%, or from about 30% to about 70% of the solids of the coating composition. The polyacryl is typically present in an amount of about 10% to about 90%, or from about 20% to about 80%, or from about 30% to about 70% of the solids of the coating composition. The ratio of the polyurethane to the polyacryl is from about 0.1 to about 9, or from about 0.25 to about 4, or from about 0.4 to about 2.5 to 1.

In another embodiment, the binder is a cellulosic polymer. The cellulosic polymers include polymers derived from cellulose such as are known in the art. An example of a cellulosic polymer includes cellulose esters. Useful cellulosic polymers include carboxyethyl cellulose, dextrin, methyl cellulose, ethyl cellulose, hydroxyethyl cellulose, hydroxypropylcellulose, hydroxypropylmethyl cellulose nitrocellulose, cellulose acetate, cellulose acetate butyrate, and cellulose acetate propionate. Exemplary nitrocellulose polymers are nitrocellulose RS types (nitrogen content of 11.5-12.2%) of Hercules Inc., (now Ashland Chemical), such as nitrocellulose—RS ½ second, —RS ¼ second, —RS ⅛ second, —RS 1/16 second or the like.

In one embodiment, the binder is a protein. Examples of the proteins include gelatin, casein, and soybean protein.

In another embodiment, the binder is a rubber. These rubbers include synthetic rubbers, such as isoprene rubbers, neoprene rubbers, polydiene polymers such as styrene-butadiene copolymers, styrene-acrylonitrile-butadiene terpolymers, styrene-isoprene copolymers, polybutadiene, polyalkenes, such as polybutene, polyisobutylene, polypropylene and polyethylene.

In another embodiment, the binder is a homopolymer or copolymer of vinyl acetate. Examples of these polymers include polyvinyl acetate, polyethylene vinyl acetate, acrylic acid or acrylate-modified ethylene vinyl acetate resins, acid-, anhydride- or acrylate-modified ethylene/vinyl acetate copolymers; acid- or anhydride-modified ethylene/acrylate copolymers. Examples of commercially available copolymers and terpolymers that can be used include the ethylene/vinyl acetate copolymers available from DuPont under the tradename Elvax®. Other examples of commercially available EVA resins are available from Air Products & Chemicals, Inc., Allentown, Pa., under the AIRFLEX® trademark. Examples include AIRFLEX® 465 (65% solids) and AIRFLEX® 7200 (72-74% solids). Another suitable EVA emulsion polymer is AIRFLEX® 426, a high solids, carboxylated, EVA polymer partially functionalized with carboxy groups. It is believed that the AIRFLEX® brand EVA emulsion polymers are stabilized with up to about 5% by weight polyvinyl alcohol ("PVOH") and/or, in some formulations, a nonionic surfactant.

In one embodiment, the binder is a styrene-acryl copolymer. The acryl component is describe above. In one embodiment, the acryl can be an acrylic acid or ester, an acrylonitrile or their methacrylic analogs. Examples of the these resins include Microgel E-1002, E-2002, E-5002 (styrene acryl resin emulsion, available from Nippon Paint Co., Ltd.), Voncoat 4001 (acryl emulsion, available from Dainippon Ink & Chemicals, Inc.), Voncoat 5454 (styrene acryl resin emulsion, available from Dainippon Ink & Chemicals, Inc.), SAE 1014 (styrene acryl resin emulsion, available from Nippon Zeon Co., Ltd.), Saivinol SK-200 (acryl resin emulsion, available from Saiden Chemical Industry Co., Ltd.), Nanocryl® SBCX-2821 (silicone-modified acryl resin emulsion, available from Toyo Ink Mfg. Co., Ltd.), Nanocryl® SBCX-3689 (silicone-modified acryl resin emulsion, available from Toyo Ink Mfg. Co., Ltd.), #3070 (methacrylic acid methyl polymer resin emulsion, available from Mikuni Color Limited), SG-60 (styrene-acryl resin emulsion, available from Gifu Ceramic Co., Ltd.), and Grandol PP-1000 (Styrene-acryl resin emulsion, available from Dainippon Ink & Chemicals, Inc.).

In one embodiment, the copolymer is a copolymer of styrene and an alkyl acrylate in which the alkyl moiety has 1 to 6 carbon atoms. Butyl acrylate is especially useful as the comonomer of styrene. One particular commercially available source of the copolymer is the styrene/butyl acrylate copolymer dispersion available under the Trademark ACRONAL® S312D, S320D and S305D from BASF.

The topcoat composition also includes a filler. Typically the fillers are those that have a surface area of at least 1 $m^2/g$. In another embodiment, the surface area of the filler is greater than 5, or greater than 10, or greater than 20. In another embodiment, the fillers are those having a surface area of greater than 200 $m^2/g$. The surface area of the filler is determined by BET (Brunauer, Emmett and Teller method described in J. American Chemical Society Vol. 60, page 309 (1938)). This method is based on the adsorption of gaseous nitrogen.

Examples of fillers include silica, such as amorphous silica, fumed silica, colloidal silica, precipitated silica and silica gels. Additional fillers include a silica, a clay, an alkaline earth metal sulfate or carbonate, an alkaline earth or transition metal oxide or hydroxide. In one embodiment, the filler has a surface area of at least about 40, or at least 60, or at least about 100 m²/g. In another embodiment, the filler is a silica gel with a surface area of at least 150, or at least about 200, or at least about 250 m²/g.

The filler is typically present in a minor amount. In one embodiment, the filler is present in an amount from about 5% up to about 49%, or from about 10% up to about 40%, or from about 15% to about 35%. In another embodiment, the filler is present in an amount greater than 20%, or greater than 30% and up to about 50%, or 45%. In one embodiment, the filler to binder ratio is at least 0.01 to about 2, or from about 0.3 to about 1.5 or from about 0.5 to about 1.

The following table contains filler that can be used in the coating compositions.

TABLE 1

| Supplier | Code | Filler Type | Surface Area (sqm/g) | Particle size (micron) |
|---|---|---|---|---|
| Degussa | Sipernat ® 570 | precipitated silica | 750 | 6.7 |
| Grace | Syloid ® W500 | silica gel | 270 | 8 |
| Grace | Sylojet ® 710A | silica gel | 235 | 1 |
| Degussa | Sipernat ® 383 DS | precipitated silica | 170 | 5 |
| Degussa | Sipernat ® 350 | precipitated silica | 50 | 3 |
| Imerys | China Clay Supreme | SiO2—Al2O3 | 16 | 1 |
| Imerys | Carbital ® 110 | calciumcarbonate | 5 | <10 |
| Viaton Industries Ltd | Airwhite ® AW5 | bariumsulphate | 1.2 | 2 |

The topcoat compositions are applied to any substrate to make an ink receptive sheet.

Other additives can be added as well to obtain a certain desired characteristic, such as waxes, defoamers, surfactants, colorants, anti-oxidants, UV stabilizers, luminescents, crosslinkers etc.

In one embodiment, the coating composition includes a wax. The wax is typically present in an amount from about 0.5% to about 10%, or from about 1% to about 5% of the solids of the coating composition. The wax helps improve scratch resistance. In one embodiment, the particles in the wax are less than 5, or less than 0.5 microns in size. The melting point of the wax or of the mixture of waxes preferably ranges from 50-150° C. In addition, the particles in the microdispersion can contain a small amount of oily or pasty fatty additives, one or more surfactants and one or more common liposoluble active ingredients, The waxes include natural (animal or plant) or synthetic substances that are solid at room temperature (20-25° C.). They are insoluble in water, soluble in oils and are capable of forming a water-repellent film. A definition of waxes is provided by, for example, P. D. Dorgan, Drug and Cosmetic Industry, December 1983, pp. 30-33. The wax(es) includes carnauba wax, candelilla wax and alfalfa wax, and mixtures thereof.

In addition to these waxes, the mixture of waxes can also contain one or more of the following waxes or family of waxes: paraffin wax, ozokerite, plant waxes, such as olive wax, rice wax, hydrogenated jojoba wax or the absolute waxes of flowers such as the essential wax of blackcurrant flower sold by the company Bertin (France), animal waxes such as beeswaxes or modified beeswaxes (cerabellina); other waxes or waxy starting materials; marine waxes such as those sold by the company Sophim under the identifier M82; natural or synthetic ceramides, and polyethylene or polyolefin waxes in general. The carnauba (extract of Copernica cerifera), candelilla (extract of Euphorbia cerifera and of Pedilantus pavonis) and alfalfa (extract of Stipa tenacissima) plant waxes are commercial products. An example of a commercially available wax is Aquacer® 537 available from Byk Cera.

In another embodiment, the coating composition includes a cross linking agent. The cross linking agent can be any of those know to those in the art. The cross linking agents can be organic or inorganic. A combination of cross linking agents can be used. The cross linking agents include such as epoxy compounds, polyfunctional aziridines, methoxyalkyl melamines, triazines, polyisocyanates, carbodiimides, polyvalent metal cations, and the like. The cross linking agent supplied by Zeneca Resins under the tradename NeoCryl® CX 100 and the cross linking agent supplied by EIT Industries under the tradename XAMA®-7 are specific examples of polyfunctional aziridine cross linking agents and the cross linking agent supplied by Union Carbide under the tradename Ucarlink XL-29SE is a specific example of a polyfunctional carbodimide cross linking agent that can be used. In another embodiment, the cross linking agent is a metal containing crosslinking agent. The cross linking agents include the organometallic catalysts containing metals of group III-A, IV-A, V-A, VI-A, VIII-A, I-B, II-B, III-B, IV-B and V-B. Particularly useful cross linking agents are tin dioctoate, tin naphthenate, dibutyltin dilaurate, dibutyltin diacetate, dibutyltin dioxide, dibutyl tin dioctoate, zirconium chelates, aluminum chelates, aluminum titanates, titanium isopropoxide, triethylene diamine, p-toluene sulfonic acid, n-butyl phosphoric acid, and mixtures thereof. Generally, the cross linking agent is present in an amount from about 0.01% to about 2%, or from about 0.3% to about 1.5%, or from about 0.5% to about 1% by weight of the solids of the coating composition.

In one embodiment, the coating compositions optionally contain water or a other suitable diluent such as alcohol. The diluent is typically present in an amount from about 10% to about 90%, or from about 20% to about 80% by weight.

The topcoat is coated onto the film substrate. The topcoat can be coated onto substrates in various manners, for instance by means of roll coating, spray coating, gravure coating, off-set coating, a casting process or by (co)extrusion. The choice for a certain production method depends strongly on the raw material characteristics and on the desired thickness of the coating.

Drying of a water or diluent based system can be done by the usual thermal drying techniques, by means of microwaves or infrared drying. Solvent-less systems can be cured thermally, by means of UV curing or Electron Beam curing.

The layers of the films can contain pigments, fillers, stabilizers, light protective agents or other suitable modifying agents if desired. The film also can contain anti-block, slip additives and anti-static agents. Useful anti-block agents include inorganic particles, such as clays, talc, calcium carbonate and glass. Slip additives useful in the present invention include polysiloxanes, waxes, fatty amides, fatty acids, metal soaps and particulate such as silica, synthetic amorphous silica and polytetrafluoroethylene powder. Anti-static agents useful in the present invention include alkali metal sulfonates, polyether-modified polydiorganosiloxanes, polyalkylphenylsiloxanes and tertiary amines.

In an embodiment, the multilayer material includes an adhesive layer disposed therein. In an embodiment, an adhesive layer forms a surface layer of the second layer. The adhesive can be pressure sensitive, heat and pressure sensitive, or a light and/or heat and/or actinic radiation activated adhesive or a heat seal material. A description of useful pressure sensitive adhesives can be found in *Encyclopedia of Polymer Science and Engineering*, Vol. 13. Wiley-Interscience Publishers (New York, 1988). Additional description of useful PSAs can be found in *Polymer Science and Technology*, Vol. 1, Interscience Publishers (New York, 1964). Conventional PSAs, including acrylic-based PSAs, rubber-based PSAs and silicone-based PSAs are useful. The PSA can be a solvent-based or can be a water-based adhesive. Hot melt adhesives also can be used. In one embodiment, the PSA comprises an acrylic emulsion adhesive.

In one embodiment, the adhesive can be formed from an acrylic-based polymer. It is contemplated that any acrylic-based polymer capable of forming an adhesive layer with sufficient tack to adhere to a substrate can function in the present invention. In certain embodiments, the acrylic polymers for the pressure-sensitive adhesive layers include those formed from polymerization of at least one alkyl acrylate monomer containing from about 4 to about 12 carbon atoms in the alkyl group, and present in an amount from about 35-95% by weight of the polymer or copolymer, as disclosed in U.S. Pat. No. 5,264,532, which is incorporated by reference herein in its entirety. Optionally, the acrylic-based pressure-sensitive adhesive might be formed from a single polymeric species.

The glass transition temperature of a PSA layer comprising acrylic polymers can be varied by adjusting the amount of polar, or "hard monomers", in the copolymer, as taught by U.S. Pat. No. 5,264,532, incorporated herein by reference in its entirety. The greater the percentage by weight of hard monomers is an acrylic copolymer, the higher the glass transition temperature. Hard monomers contemplated useful for the present invention include vinyl esters, carboxylic acids, and methacrylates, in concentrations by weight ranging from about zero to about thirty-five percent by weight of the polymer.

The PSA can be acrylic-based such as those taught in U.S. Pat. No. 5,164,444 (acrylic emulsion), U.S. Pat. No. 5,623,011 (tackified acrylic emulsion) and U.S. Pat. No. 6,306,982. The adhesive can also be rubber-based such as those taught in U.S. Pat. No. 5,705,551 (rubber hot melt). It also can be radiation curable mixture of monomers with initiators and other ingredients such as those taught in U.S. Pat. No. 5,232,958 (UV cured acrylic) and U.S. Pat. No. 5,232,958 (EB cured). The disclosures of these patents as they relate to acrylic adhesives are hereby incorporated by reference in their entireties.

Commercially available PSAs are useful in the invention. Examples of these adhesives include the hot melt PSAs available from H.B. Fuller Company, St. Paul, Minn. as HM-1597, HL-2207-X, HL-2115-X, HL-2193-X. Other useful commercially available PSAs include those available from Century Adhesives Corporation, Columbus, Ohio. Another useful acrylic PSA comprises a blend of emulsion polymer particles with dispersion tackifier particles as generally described in Example 2 of U.S. Pat. No. 6,306,982. The polymer is made by emulsion polymerization of 2-ethylhexyl acrylate, vinyl acetate, dioctyl maleate, acrylic and methacrylic comonomers as described in U.S. Pat. No. 5,164,444 resulting in the latex particle size of about 0.2 microns in weight average diameters and a gel content of about 60%. The disclosures of these patents as they relate to acrylic adhesives are hereby incorporated by reference in their entireties.

A commercial example of a hot melt adhesive is H2187-01, sold by Ato Findley, Inc., of Wauwatusa, Wis. In addition, rubber-based block copolymer PSAs described in U.S. Pat. No. 3,239,478 also can be utilized in the adhesive constructions of the present invention, and this patent is hereby incorporated by a reference in its entirety.

In another embodiment, the pressure-sensitive adhesive comprises rubber-based elastomer materials containing useful rubber-based elastomer materials including linear, branched, grafted, or radial block copolymers represented by the diblock structure A-B, the triblock A-B-A, the radial or coupled structures $(A-B)_n$, and combinations of these where A represents a hard thermoplastic phase or block that is non-rubbery or glassy or crystalline at room temperature but fluid at higher temperatures, and B represents a soft block that is rubbery or elastomeric at service or room temperature. These thermoplastic elastomers can comprise from about 75% to about 95% by weight of rubbery segments and from about 5% to about 25% by weight of non-rubbery segments.

The non-rubbery segments or hard blocks comprise polymers of mono- and polycyclic aromatic hydrocarbons, and more particularly vinyl-substituted aromatic hydrocarbons that can be monocyclic or bicyclic in nature. Rubbery materials such as polyisoprene, polybutadiene, and styrene butadiene rubbers can be used to form the rubbery block or segment. Particularly useful rubbery segments include polydienes and saturated olefin rubbers of ethylene/butylene or ethylene/propylene copolymers. The latter rubbers can be obtained from the corresponding unsaturated polyalkylene moieties such as polybutadiene and polyisoprene by hydrogenation thereof.

The block copolymers of vinyl aromatic hydrocarbons and conjugated dienes that can be utilized include any of those that exhibit elastomeric properties. The block copolymers can be diblock, triblock, multiblock, starblock, polyblock or graftblock copolymers. Throughout this specification, the terms diblock, triblock, multiblock, polyblock, and graft or grafted-block with respect to the structural features of block copolymers are to be given their normal meaning as defined in the literature such as in the Encyclopedia of Polymer Science and Engineering, Vol. 2, (1985) John Wiley & Sons, Inc., New York, pp. 325-326, and by J. E. McGrath in Block Copolymers, Science Technology, Dale J. Meier, Ed., Harwood Academic Publishers, 1979, at pages 1-5.

Such block copolymers can contain various ratios of conjugated dienes to vinyl aromatic hydrocarbons including those containing up to about 40% by weight of vinyl aromatic hydrocarbon. Accordingly, multi-block copolymers can be utilized that are linear or radial symmetric or asymmetric and that have structures represented by the formulae A-B, A-B-A, A-B-A-B, B-A-B, $(AB)_{0,1,2}$ . . . BA, etc., wherein A is a polymer block of a vinyl aromatic hydrocarbon or a conjugated diene/vinyl aromatic hydrocarbon tapered copolymer block, and B is a rubbery polymer block of a conjugated diene.

The block copolymers can be prepared by any of the well-known block polymerization or copolymerization procedures including sequential addition of monomer, incremental addition of monomer, or coupling techniques as illustrated in, for example, U.S. Pat. Nos. 3,251,905; 3,390,207; 3,598,887; and 4,219,627, the disclosures of which are hereby incorporated by reference in their entireties. As well known, tapered copolymer blocks can be incorporated in the multi-block copolymers by copolymerizing a mixture of conjugated diene and vinyl aromatic hydrocarbon monomers utilizing the difference in their copolymerization reactivity rates. Various patents describe the preparation of multi-block copolymers containing tapered copolymer blocks including U.S. Pat. Nos. 3,251,905; 3,639,521; and 4,208,356, the disclosures of which are hereby incorporated by reference in their entireties.

Conjugated dienes that can be utilized to prepare the polymers and copolymers are those containing from 4 to about 10 carbon atoms and more generally, from 4 to 6 carbon atoms. Examples include from 1,3-butadiene, 2-methyl-1,3-butadiene(isoprene), 2,3-dimethyl-1,3-butadiene, chloroprene, 1,3-pentadiene, 1,3-hexadiene, etc. Mixtures of these conjugated dienes also can be used.

Examples of vinyl aromatic hydrocarbons that can be utilized to prepare the copolymers include styrene and the various substituted styrenes such as o-methylstyrene, p-methylstyrene, p-tert-butylstyrene, 1,3-dimethylstyrene, alpha-methylstyrene, beta-methylstyrene, p-isopropylstyrene, 2,3-dimethylstyrene, o-chlorostyrene, p-chlorostyrene, o-bromostyrene, 2-chloro-4-methylstyrene, etc.

Many of the above-described copolymers of conjugated dienes and vinyl aromatic compounds are commercially available. The number average molecular weight of the block copolymers, prior to hydrogenation, is from about 20,000 to about 500,000, or from about 40,000 to about 300,000.

The average molecular weights of the individual blocks within the copolymers can vary within certain limits. In most instances, the vinyl aromatic block will have a number average molecular weight in the order of about 2000 to about 125,000, or between about 4000 and 60,000. The conjugated diene blocks either before or after hydrogenation will have number average molecular weights in the order of about 10,000 to about 450,000, or from about 35,000 to 150,000.

Also, prior to hydrogenation, the vinyl content of the conjugated diene portion generally is from about 10% to about 80%, or from about 25% to about 65%, particularly 35% to 55% when it is desired that the modified block copolymer exhibit rubbery elasticity. The vinyl content of the block copolymer can be measured by means of nuclear magnetic resonance.

Specific examples of diblock copolymers include styrene-butadiene ("SB"), styrene-isoprene ("SI"), and the hydrogenated derivatives thereof. Examples of triblock polymers include styrene-butadiene-styrene ("SBS"), styrene-isoprene-styrene ("SIS"), alpha-methylstyrene-butadiene-alpha-methylstyrene, and alpha-methylstyrene-isoprene alpha-methylstyrene. Examples of commercially available block copolymers useful as the adhesives in the present invention include those available from Kraton Polymers LLC under the KRATON® trade name.

Upon hydrogenation of the SBS copolymers comprising a rubbery segment of a mixture of 1,4 and 1,2 isomers, a styrene-ethylene-butylene styrene ("SEBS") block copolymer is obtained. Similarly, hydrogenation of an SIS polymer yields a styrene-ethylene propylene-styrene ("SEPS") block copolymer.

The selective hydrogenation of the block copolymers can be carried out by a variety of well known processes including hydrogenation in the presence of such catalysts as Raney nickel, noble metals such as platinum, palladium, etc., and soluble transition metal catalysts. Suitable hydrogenation processes that can be used are those wherein the diene-containing polymer or copolymer is dissolved in an inert hydrocarbon diluent such as cyclohexane and hydrogenated by reaction with hydrogen in the presence of a soluble hydrogenation catalyst. Such procedures are described in U.S. Pat. Nos. 3,113,986 and 4,226,952, the disclosures of which are incorporated herein by reference in their entireties. Such hydrogenation of the block copolymers that are carried out in a manner and to extent as to produce selectively hydrogenated copolymers having a residual unsaturation content in the polydiene block of from about 0.5% to about 20% of their original unsaturation content prior to hydrogenation.

In one embodiment, the conjugated diene portion of the block copolymer is at least 90% saturated and more often at least 95% saturated while the vinyl aromatic portion is not significantly hydrogenated. Particularly useful hydrogenated block copolymers are hydrogenated products of the block copolymers of styrene-isoprene-styrene such as a styrene-(ethylene/propylene)-styrene block polymer. When a polystyrene-polybutadiene-polystyrene block copolymer is hydrogenated, it is desirable that the 1,2-polybutadiene to 1,4-polybutadiene ratio in the polymer is from about 30:70 to about 70:30. When such a block copolymer is hydrogenated, the resulting product resembles a regular copolymer block of ethylene and 1-butene ("EB"). As noted above, when the conjugated diene employed as isoprene, the resulting hydrogenated product resembles a regular copolymer block of ethylene and propylene ("EP").

A number of selectively hydrogenated block copolymers are available commercially from Kraton Polymers under the general trade designation "KRATON® G." One example is KRATON® G1652, which is a hydrogenated SBS triblock comprising about 30% by weight of styrene end blocks and a midblock, which is a copolymer of ethylene and 1-butene ("EB"). A lower molecular weight version of G1652 is available under the designation KRATON® G1650. KRATON® G1651 is another SEBS block copolymer that contains about 33% by weight of styrene. KRATON® G1657 is an SEBS diblock copolymer that contains about 13% w styrene. This styrene content is lower than the styrene content in KRATON® G1650 and KRATON® G1652.

In another embodiment, the selectively hydrogenated block copolymer is of the formula

$B_n(AB)_oA_p$ wherein n=0 or 1; o is 1 to 100; p is 0 or 1; each B prior to hydrogenation is predominantly a polymerized conjugated diene hydrocarbon block having a number average molecular weight of about 20,000 to about 450,000; each A is predominantly a polymerized vinyl aromatic hydrocarbon block having a number average molecular weight of from about 2000 to about 115,000; the blocks of A constituting about 5% to about 95% by weight of the copolymer; and the unsaturation of the block B is less than about 10% of the original unsaturation. In other embodiments, the unsaturation of block B is reduced upon hydrogenation to less than 5% of its original value, and the average unsaturation of the hydrogenated block copolymer is reduced to less than 20% of its original value.

The block copolymers also can include functionalized polymers such as can be obtained by reacting an alpha, beta-olefinically unsaturated monocarboxylic or dicarboxylic acid reagent onto selectively hydrogenated block copolymers of vinyl aromatic hydrocarbons and conjugated dienes as described above. The reaction between the carboxylic acid reagent in the graft block copolymer can be effected in solutions or by a melt process in the presence of a free radical initiator.

The preparation of various selectively hydrogenated block copolymers of conjugated dienes and vinyl aromatic hydrocarbons that have been grafted with a carboxylic acid reagent is described in a number of patents including U.S. Pat. Nos. 4,578,429; 4,657,970; and 4,795,782, and the disclosures of these patents relating to grafted selectively hydrogenated block copolymers of conjugated dienes and vinyl aromatic compounds, and the preparation of such compounds are hereby incorporated by reference in their entireties. U.S. Pat. No. 4,795,782 describes and gives examples of the preparation of the grafted block copolymers by the solution process and the melt process. U.S. Pat. No. 4,578,429 contains an example of grafting of KRATON® G1652 ("SEBS") polymer with maleic anhydride with 2,5-dimethyl-2,5-di(t-butylperoxy)hexane by a melt reaction in a twin screw extruder.

Examples of commercially available maleated selectively hydrogenated copolymers of styrene and butadiene include KRATON® FG1901X, FG1921X, and FG1924X, often referred to as maleated selectively hydrogenated SEBS copolymers. FG1901X contains about 1.7% w bound functionality as succinic anhydride and about 28% w of styrene. FG1921X contains about 1% w of bound functionality as succinic anhydride and 29% w of styrene. FG1924X contains about 13% styrene and about 1% bound functionality as succinic anhydride.

Useful block copolymers also are available from Nippon Zeon Co., 2-1, Marunochi, Chiyoda-ku, Tokyo, Japan. For example, Quintac® 3530 is available from Nippon Zeon and is believed to be a linear styrene-isoprene-styrene block copolymer.

Unsaturated elastomeric polymers and other polymers and copolymers that are not inherently tacky can be rendered tacky when compounded with an external tackifier. Tackifiers, are generally hydrocarbon resins, wood resins, rosins, rosin derivatives, and the like, which when present in concentrations ranging from about 40% to about 90% by weight of the total adhesive composition, or from about 45% to about 85% by weight, impart pressure-sensitive adhesive characteristics to the elastomeric polymer adhesive formulation. Compositions containing less than about 40% by weight of tackifier additive do not generally show sufficient "quickstick," or initial adhesion, to function as a pressure-sensitive adhesive, and therefore are not inherently tacky. Compositions with too high a concentration of tackifying additive, on the other hand, generally show too little cohesive strength to work properly in most intended use applications of constructions made.

It is contemplated that any tackifier known by those of skill in the art to be compatible with elastomeric polymer compositions can be used. One such tackifier, found useful is Wing-Tack® 10, a synthetic polyterpene resin that is liquid at room temperature, and sold by the Goodyear Tire and Rubber Company of Akron, Ohio. WingTack® 95 is a synthetic tackifier resin also available from Goodyear that comprises predominantly a polymer derived from piperylene and isoprene. Other suitable tackifying additives can include Escorez™ 1310, an aliphatic hydrocarbon resin, and Escorez™ 2596, a $C_5$-$C_9$ (aromatic modified aliphatic) resin, both manufactured by Exxon of Irving, Tex. Of course, as can be appreciated by those of skill in the art, a variety of different tackifying additives can be used.

In addition to the tackifiers, other additives can be included in the PSAs to impart desired properties. For example, plasticizers can be included, and they are known to decrease the glass transition temperature of an adhesive composition containing elastomeric polymers. An example of a useful plasticizer is Shellflex® 371, a naphthenic processing oil available from Shell Lubricants of Texas. Antioxidants also can be included on the adhesive compositions. Suitable antioxidants include Irgafos® 168 and Irganox® 565 available from Ciba-Geigy, Hawthorne, N.Y. Cutting agents such as waxes and surfactants also can be included in the adhesives.

The pressure sensitive adhesive can be applied from a solvent, emulsion or suspension, or as a hot melt. The adhesive can be applied to the outer surface of the film by any known method. For example, the adhesive can be applied by die coating, curtain coating, spraying, dipping, rolling, gravure or flexographic techniques. The adhesive can be applied to the film in a continuous layer, a discontinuous layer or in a pattern. In one embodiment, an adhesive deadener is applied to portions of the adhesive layer to allow for selective adhesion. In one embodiment, non-adhesive material such as ink dots or microbeads are applied to at least a portion of the adhesive surface to allow the adhesive layer to slide on the surface of a to be bonded article as the film is being applied and/or to allow air trapped at the interface between the adhesive film and another layer or object to escape.

A single layer of adhesive can be used or multiple adhesive layers can be used. Depending on the film used and the end use for the multilayer material it can be desirable to use a first adhesive layer adjacent to the film and a second adhesive layer having a different composition on the surface to be applied to the other surface or article for sufficient tack, peel strength and shear strength.

In an embodiment, the multilayer materials include one or more print layers. The print layer can be an ink or graphics layer, and the print layer can be a mono-colored or multi-colored print layer depending on the printed message and/or the intended decorative or pictorial design. These include variable imprinted data such as serial numbers, bar codes, trademarks, etc. The thickness of the print layer is typically in the range of about 0.5 to about 10 microns, and in one embodiment about 1 to about 5 microns, and in another embodiment about 3 microns. The inks used in the print layer include commercially available water-based, solvent-based or radiation-curable inks Examples of these inks include Sun Sheen (a product of Sun Chemical identified as an alcohol dilutable polyamide ink), Suntex® MP (a product of Sun Chemical identified as a solvent-based ink formulated for surface printing acrylic coated substrates, PVDC coated substrates and polyolefin films), X-Cel (a product of Water Ink Technologies identified as a water-based film ink for printing film substrates), Uvilith AR-109 Rubine Red (a product of Daw Ink identified as a UV ink) and CLA91598F (a product of Sun Chemical identified as a multibond black solvent-based ink).

In one embodiment, the print layer comprises a polyester/vinyl ink, a polyamide ink, an acrylic ink and/or a polyester ink. The print layer can be formed in the conventional manner by, for example, screen, gravure, flexographic or UV flexographic printing or the like, an ink composition comprising a resin of the type described above, a suitable pigment or dye and one or more suitable volatile solvents onto one or more desired areas of the film. After application of the ink composition, the volatile solvent component(s) of the ink composition evaporate(s), leaving only the non-volatile ink components to form the print layer.

In an embodiment, the multilayer material includes a release coating or surface or layer at a second surface of the first layer. A release coating or layer or surface can be any release material known to those skilled in the pressure sensitive label arts. Examples include silicone release materials, fluorocarbon release materials, polyethylene release materials and the like. In an embodiment the release surface comprises a silicone coating. The release coating or layer or surface can have an embossed surface and/or have non-adhesive material, such as microbeads or printed ink dots, applied to the surface of the release material.

Figure 3:
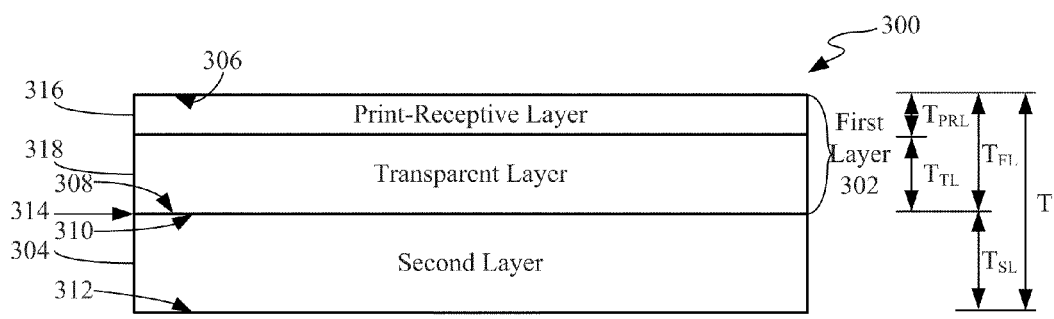
FIG. 3 is a sectional view of the sheet of multilayer material of FIG. 1 taken along line 3-3.

Referring now to FIG. 3, which is a sectional view of a sheet of multilayer material 300, e.g., the sheet of multilayer material 100 shown in FIG. 1, embodiments of the present invention include at least two layers, for example, a first layer 302 and a second layer 304. While this discussion will focus on the multilayer material having two layers 302 and 304, individuals having ordinary skill in the art should understand that embodiments of the multilayer material can include more than two layers. For, example either the first or the second layer also can include additional layers known to those skilled in the packaging films art, such as gas and moisture barrier layers, tie layers and the like. The first layer includes a first surface 306 and an opposing second surface 308, and the second layer correspondingly includes a first surface 310 and an opposing second surface 312. As shown in FIG. 3, the first layer's second surface is coupled to, and disposed on, the second layer's first surface, with an interface 314 between the first layer and the second layer. The interface is configured to allow the first layer to be separated from the second layer.

The first layer 302 of the embodiment 300 shown in FIG. 3 includes two layers—a print-receptive surface layer 316 that is made of a transparent, print-receptive material, which may be provided in an inherently printable film per se, or a corona or flame or plasma treated film, or a printable top coat coating layer and a transparent polymeric film layer 318. Where an inherently printable film material is employed, the first layer can be a monolayer material or can be a multilayer material with the inherently printable film layer being disposed to define the print-receptive surface layer. The inherently printable film can be laminated to another film layer or coextruded with other film layers. Illustrative polymers for use as the inherently printable film or as binders in a printable top coat composition can include: a polyethylene polymer or copolymer, linear low density polyethylene ("LLDPE"), low density polyethylene, ultra-low density polyethylene, medium density polyethylene, high density polyethylene, metallocene catalyzed plastomer LLDPE, elastomer LLDPE, zinc or sodium neutralized ionomers, ethylene-vinyl acetate ("EVA") copolymers, ethylene-methacrylate ("EMA") copolymers, ethylene-acrylic acid ("EAA") copolymers, ethylene-methacrylic acid ("EMAA") copolymers, ethylene-vinyl alcohol ("EVOH") copolymers, propylene-ethylene copolymers, ethylene-propylene copolymers, maleic anhydride grafted polyolefins and olefinic copolymers, polymethyl methacrylate ("PMMA"), polyurethanes and mixtures or blends of any two or more of the foregoing polymers and copolymers.

The transparent layer can be made of, for example, one or the following materials: polyester, e.g., polyethylene terephthalate ("PET"); biaxially oriented polypropylene ("BOPP"), PETG, polycarbonate, polylactic acid, cellulosics aliphatic Nylons, polystyrenes and acrylics such as PMMA. The thickness of the print-receptive layer ("$T_{PRL}$") can range in value from approximately 0.1 to about 30% of the total thickness of the overall construction. The thickness of the transparent layer ("$T_{TL}$") can range in value from approximately about 0.1 to about 20% of the total thickness of the overall construction, and can be for example from about 5 microns to approximately 50 microns thick. Accordingly, the thickness of the first layer ("$T_{FL}$") can range in value from about 0.1% to about 60% of the total thickness of the overall construction and can be for example between approximately 5 microns to approximately 60 microns in thickness.

The printing material such as inks, dyes, pigments, coatings, dissolved in a suitable solvent such as nitrocellulose, are selected to form informative or decorative indicia onto the print receiving surface of the first layer by being printed or deposited using conventional printing/depositing equipment and systems, known to those in the label printing and flexible packaging printing arts. Illustrative inks and printer systems include, solvent-based inks, UV curable inks, and water-based inks, and/or toner-based printing media, printed/deposited using any of a wide variety of standard commercial print methods including, for example, rotogravure, offset lithography, flexography, screen, letterpress, UV Flexo and inkjet to name a few. Also, the layer of transparent material can be monolayer, as shown in FIG. 3, or multilayer (as long as all of the layers in the multilayer construction are transparent or at least partially transparent).

Although the embodiment 300 shown in FIG. 3 includes a first layer 302 that has two layers, i.e., a print-receptive layer 316 and a transparent layer 318, in other embodiments, the first layer includes only one layer of material. Also, the first layer can include a layer of transparent material that is inherently printable or can be rendered printable (by commercial printing processes) through the use of, for example, corona or flame treatment whereby the surface energy and composition of the first layer surface is modified during the treatment step. An example of an inherently printable transparent material can include, for instance, polyethylene terephthalate ("PET") film. An example of a transparent material that can be rendered printable through treatment can include, for instance, biaxially oriented polypropylene ("BOPP"). Other such transparent materials, either inherently printable or rendered printable through treatment are well known by those ordinarily skilled in the art. Also, while the prior discussion indicates that the first layer is transparent, it should be understood to individuals having ordinary skill in the art that the first layer, or the layers that are included in the first layer, may be only partially transparent, or fully or partially transparent only in specific regions and not throughout the entire first layer.

The second layer 304 can be made of a transparent or opaque material, e.g., polyester, e.g., polyethylene terephthalate ("PET") and/or polyethylene terephthalate-co-glycolate ("PETG") or polyethylene terephthalate-co-adipate; polyamides such as Nylon materials including but not limited to Nylon 612 and Nylon 610, polycarbonate or acrylics, biaxially oriented polypropylene ("BOPP");"), high density polyethylene ("HDPE"), low density polyethylene ("LDPE"), linear low density polyethylene ("LLDPE"), metallocene polyethylene ("mPE"), polystyrene, polylactic acid ("PLA"), biaxially oriented nylon ("BON"), ethylene acrylic acid ("EAA"), ethylene vinyl acetate ("EVA"), ethylene methacrylates ("EMA"), and other such materials known to those ordinarily skilled in the art;. The thickness of the second layer ("$T_{SL}$") can range from approximately 5 microns to approximately 200 microns or alternatively, may have a thickness value of from about 0.2% to about 10% of the total thickness of the overall construction. Accordingly, the overall thickness of the multilayer material 300 ("T"), which includes the thickness of the first layer 302 ("$T_{FL}$") and the thickness of the second layer ("$T_{SL}$") can range in value from approximately 10 microns to approximately 300 microns, or may have a thickness value of from about 49.8% to about 99.8% of the total thickness of the overall construction.

The multilayer material can be configured into flexible packaging or a label and provided around an article or container using conventional packaging and/or labeling equipment. Examples of packaging equipment and label applicators are disclosed in U.S. Pat. Nos. 4,749,428; 4,844,760; 4,923,557; 5,512,120; 5,855,710; 5,858,168 and 5,964,974, incorporated by reference herein in their entireties.

The sheet of multilayer material 300 shown in FIGS. 1 and 3 can be assembled by providing the first layer as its own preformed subassembly or sublaminate including a print surface, skin or coating or film layer disposed on the transparent film layer and having a silicone release coat layer disposed on the transparent film layer opposite the print surface. The subassembly comprising the first layer can be prepared by conventional methods. The transparent film layer is provided and the silicone release layer can be formed thereon by in-line or off-line siliconization methods known to those skilled in the art. Thereafter, if a separate printable topcoat layer is applied to the opposed surface of the transparent film opposite the silicone release layer, standard coating technologies can be used. If a print enhancing energy treatment is to be employed to define a printable surface on the transparent film layer, to film can be exposed to a corona treatment lamp or device an flame treatment apparatus or a plasma treatment apparatus known to those skilled in this art, before or after siliconization.

The second layer can also be provided as its own preformed subassembly or sublaminate. One or more layers selected from polymer films, metal or paper or cellulosics are provided in accordance with conventional methods and equipment by coextrusion, extrusion coating, extrusion lamination, adhesive lamination, metallization, thermal bonding and the like and thereafter an adhesive layer can be applied on a top or first surface of the second layer by conventional coating methods to provide the second layer sublaminate or subassembly. The first layer subassembly and the second layer subassembly are joined together with the first layer subassembly in its first orientation so that its release surface is disposed in contact with the adhesive layer of the second layer subassembly by passing the joined subassemblies through a nip formed between opposed pressure rollers. The overall multilayer material comprising the first layer subassembly and the second layer subassembly are bonded together to form an integral unitary monolithic multilayer material that is adhesively bonded together but includes an intended line of separation or separability along the boundary formed between the release surface and the adhesive surface in this first orientation for the first layer. This bonded monolithic multilayer material can be handled and printed in conventional printing and converting equipment without separating or delaminating along the line of separability because a selected release force is provided for peeling or separating the first layer sublaminate from the second layer sublaminate of from about 25 to about 100 grams per two inch, preferably from about 40 to about 80 grams per two inch. At these release force levels, unintentional delamination or separation of the multilayer material generally does not occur under usual processing conditions.

The sheet of multilayer material 100 and 300, more specifically the interface 314 between the first layer 302 and the second layer 304 intentionally is configured so the first layer and the second layer are separable. In particular, the first layer's second surface 308 is configured to be separated (also referred to as delaminated or decoupled) from the second layer's first surface 310. Also, the first layer and the second layer are configured to be recombined (also referred to as re-laminated or re-coupled) after separation. A permanent bond eventually is formed between the first layer and the second layer after the first layer is re-coupled to the second layer. The fact that the first layer is configured to be separated from the second layer, and then recombined makes the sheet of multilayer material useful in the creation of packaging material where information that is printed on the packaging material is protected, as discussed below.

Figure 4:
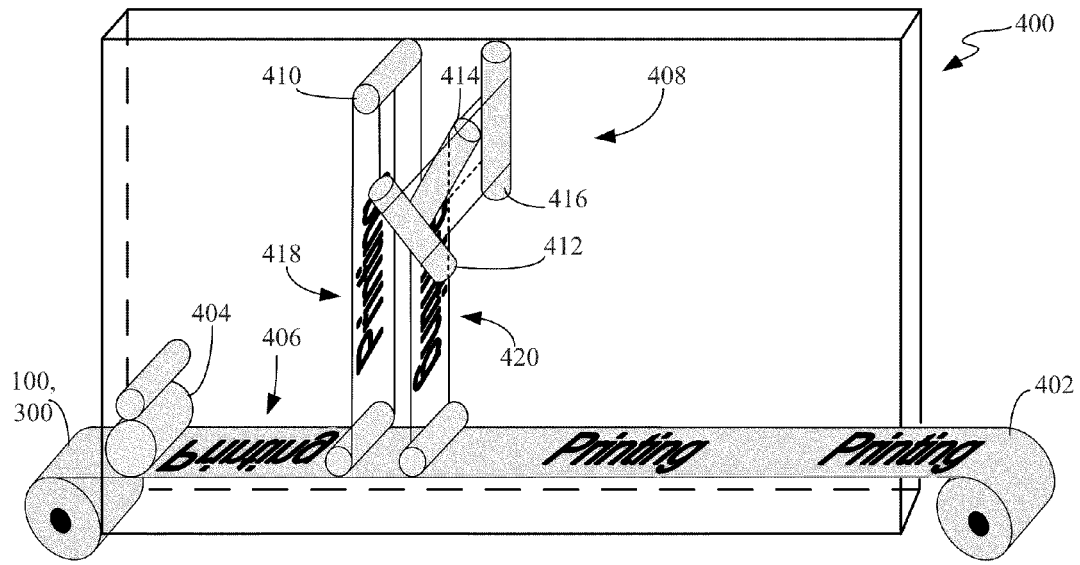
FIG. 4 is a perspective illustration of a converting apparatus.

Referring additionally to the perspective illustration of a printing/converting equipment line 400 shown in FIG. 4, during preparation of a sheet of the packaging material 402, the sheet of multilayer material 100 and 300 (in roll format) is input to the printer/converter. Next, a print station 404 within the printer/converter prints, e.g., reverse prints, and/or deposits information 406, e.g., wording, bar codes, color, graphics, bar codes, or other indicia on the first layer's print-receptive layer 316.

After the information 406 is printed/deposited on the first layer 302, the web paths of the first layer sublaminate and the second layer sublaminate are made to diverge thereby separating the multilayer material along the intended line of separation. Next, the converter 400 passes the first layer through a turn bar subassembly 408 that includes a plurality of rollers 410-416, as described in U.S. Pat. No. 5,996,491 to Kishine et al., which is incorporated by reference herein in its entirety. After passing through the turn bar section, the first layer is flipped or inverted relative to its initial or first orientation 418 prior to passing through the turn bar section, resulting in a second orientation 420. While not shown in FIG. 4, the separated second layer sublaminate 304 may pass through a series of idler rollers or an accumulator so that the web path length of the separated first and second layers match before they are rejoined as discussed below.

Figure 5:
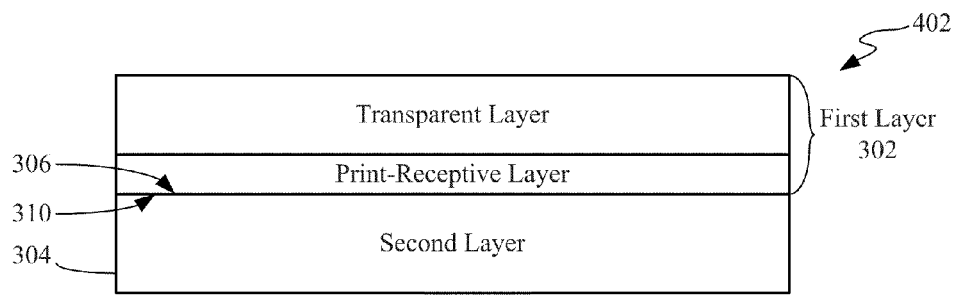
FIG. 5 is a sectional view of the sheet of multilayer material of FIGS. 1 and 3 after processing by a converting apparatus.

In the next step, the converter 400 brings the first and second layers 302 and 304 back together (also referred to as re-laminating or re-coupling the first and second layers) with one another, so the resulting sheet of multilayer material 402 is configured with the first layer's first surface 306 coupled to the second layer's first surface 310 (see FIG. 5), The first and second layers can be re-coupled to one another using an adhesive, e.g., a pressure-sensitive adhesive, or a temperature and/or pressure bonding process, which are discussed below. In this manner, the information 406 that was printed/deposited on the first layer's first surface, i.e., on top of the print-receptive layer 316, is now located between the first and second layers, and is visible through, and protected by, the first layer's print-receptive layer and transparent layer 318. Also, because the turn bar flips the first layer's orientation 418, the printed information, which initially was reversed, is now no longer reversed when viewed through the first layer 302. Finally, after the converter re-couples the first layer to the second layer, the converter outputs the resulting multilayer material 402, which is stored in a roll. This resulting material, which includes the re-coupled first and second layers after the reorientation of the first layer, is the non-separable permanently bonded multilayer material that is used for packaging, labeling, protection of products, etc.

Advantageously, the previously discussed embodiment is a multilayer material 100 and 300 that can be processed, e.g., the multilayer material is printed, the first layer 302 is separated from the second layer 304, the orientation 418 of at least the first layer is changed, and the first and second layers are re-coupled, to create a multilayer material 402 in a single pass. Accordingly, the embodiment results in a simplified manufacturing process because it eliminates the need to take two input materials and combine them into one sheet of multilayer material at the converter. Also, the embodiment eliminates the need for an added laminating adhesive to be used to join the first layer after the information is printed/deposited to a separately fed and handled base laminate as would be required without the benefit of this embodiment.

Figure 6A:
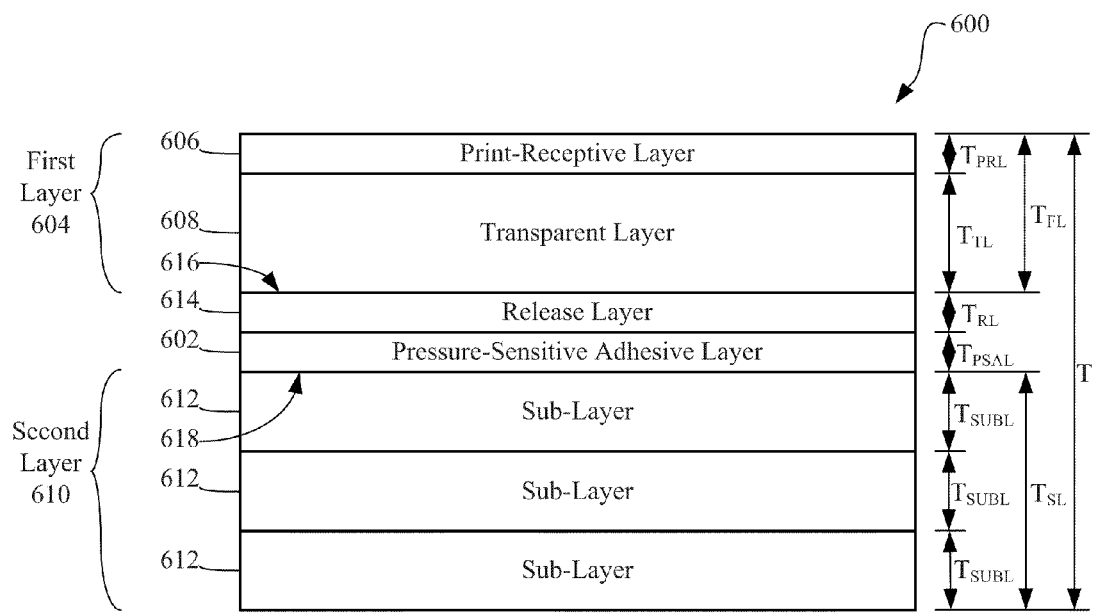
FIG. 6A is a sectional view of a sheet of multilayer material according to another preferred embodiment.

In one embodiment, the first and second layers 302 and 304 of the sheet of multilayer material 100 and 300 are coupled to one another with a layer of pressure-sensitive adhesive ("PSA") both before the first and second layers are separated and after the first and second layers are re-coupled. An example embodiment of a sheet of multilayer material 600 having a layer of pressure-sensitive adhesive 602 is shown in FIG. 6A, which is a sectional view of the sheet of multilayer material before it is processed by a converter 400. As shown in FIG. 6A, the first layer 604 includes a print-receptive layer 606 that is coupled to a transparent layer 608 or a first transparent layer that is inherently printable or can be rendered printable through a treatment process such as those known by those ordinarily skilled in the art In additional embodiments, the transparent layer 608 and/or print-receptive layer 606 can include a material that provides additional functional benefits, e.g., a ultraviolet-resistant ("UV-resistant") material or an antistatic material. In other embodiments, the first layer 604 can include an additional layer of material, which is coupled between the print receptive layer and the transparent layer, or between the transparent layer and a second layer 610, and provides the previously mentioned additional functional benefits, i.e., light and heat and oxygen stabilization.

In FIG. 6A, the second layer 610 includes more than one layer of material. In this embodiment, the second layer includes three sub-layers 612, each of which can be made of the following: film, e.g., polyester, e.g., polyethylene terephthalate ("PET"); biaxially oriented polypropylene ("BOPP"); high density polyethylene ("HDPE"), low density polyethylene ("LDPE"), linear low density polyethylene ("LLDPE"), metallocene polyethylene ("mPE"), polystyrene, polycarbonate, polylactic acid ("PLA"), biaxially oriented nylon ("BON"), ethylene acrylic acid ("EAA"), ethylene vinyl acetate ("EVA"), ethylene methacrylates ("EMA"), poly styrene polymers and copolymers, vinyl films (PVC, PVF, PVDF) and other such materials known to those ordinarily skilled in the art; foil, e.g., aluminum foil or metallized film; paper (paperboard, freesheet paper, and the like); or any combination of these materials. The specific material that is used in each of the three sub-layers can be selected to achieve a specific final performance requirement, e.g., resistance to the transmission of gasses or water. The second layer's three sub-layers are coupled to one another via, for example, adhesive lamination, extrusion lamination, or thermal lamination. Each of the sub-layers can have a thickness ("$T_{SUBL}$") that ranges in value from approximately 5 microns to approximately 50 microns, and the thickness of the three sub-layers need not be the same. Accordingly, the thickness of the second layer ("$T_{SL}$") can range in value from approximately 15 microns to approximately 300 microns when the second layer includes three sub-layers. In additional embodiments, the second layer is not just limited to including three sub-layers, i.e., the second layer can include less than, or more than, three sub-layers. For example, the second layer can include only one sub-layer, two sub-layers, four sub-layers, or five sub-layers of material.

As shown in FIG. 6A, the first layer 604 and the second layer 610 are coupled to one another via a layer of release material 614, which, for example, can be made of silicone or other sufficiently low surface energy material and a layer of pressure-sensitive adhesive 602, which, for example, can be made of one or more of the above described pressure-sensitive adhesives. The layer of release material is shown coupled to the bottom (also known as the second) surface 616 of the first layer, and the pressure-sensitive adhesive layer is shown coupled to the top (also known as first) surface 618 of the second layer between the release layer and the second layer. Accordingly, the overall thickness of the sheet of multilayer material 600 ("T") before passing through a converter 400 can range in value from approximately 10 microns to approximately 300 microns. The separation interface is defined at the release material layer-pressure sensitive adhesive layer boundary. The layer of release material is configured to allow for the separation of the first layer from the combination of the second layer and the layer of pressure-sensitive adhesive.

During manufacturing, the embodiment of the multilayer material 600 in its initial state, as shown in FIG. 6A, is input to the converter 400. The converter's print station 404 prints/deposits information on the first layer's first surface 604, and then, the converter separates the combination of the first layer and the release layer 614 from the combination of the second layer 610 and the pressure-sensitive adhesive layer 602. The layer of pressure-sensitive adhesive remains coupled to the second layer after the first and second layers are decoupled from one another.

Figure 6B:
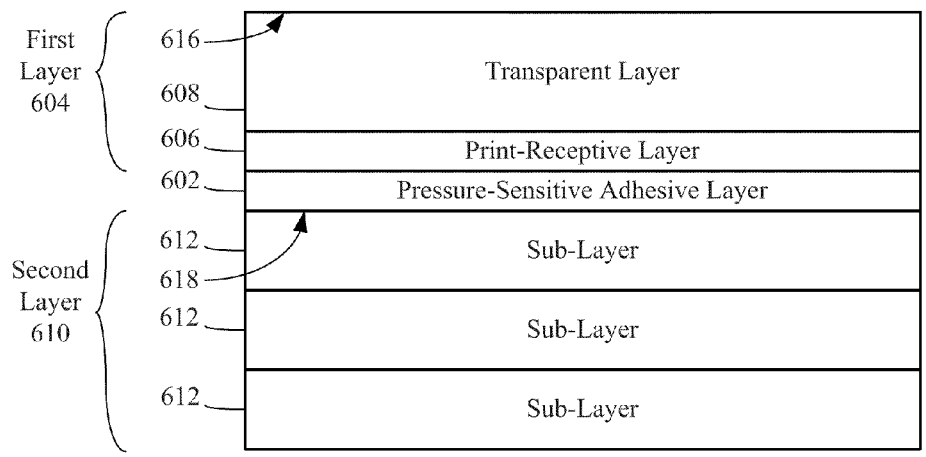
FIG. 6B is a sectional view of a sheet of multilayer material of FIG. 6A after processing by a converting apparatus.

As previously discussed, the decoupled first layer 604 then passes through the converter's turn bar 408, which flips the first layer's orientation 418. Next, the converter brings the first layer back in contact with the combination of the second layer 610 and the layer of pressure-sensitive adhesive 602, and re-couples the first layer to the second layer with the layer of pressure-sensitive adhesive coupled between the first and second layers, as shown in FIG. 6B. In this manner the information 406 printed/deposited on the first layer's print-receptive layer 606 is positioned between the print-receptive layer and the layer of pressure-sensitive adhesive. The re-coupling of the first layer to the second layer using the adhesive layer constitutes one example embodiment of a re-lamination process for the material. The pressure-sensitive is configured to be sufficiently permanent to allow the re-lamination process to produce a permanently bonded multilayer laminate material.

Figure 7A:
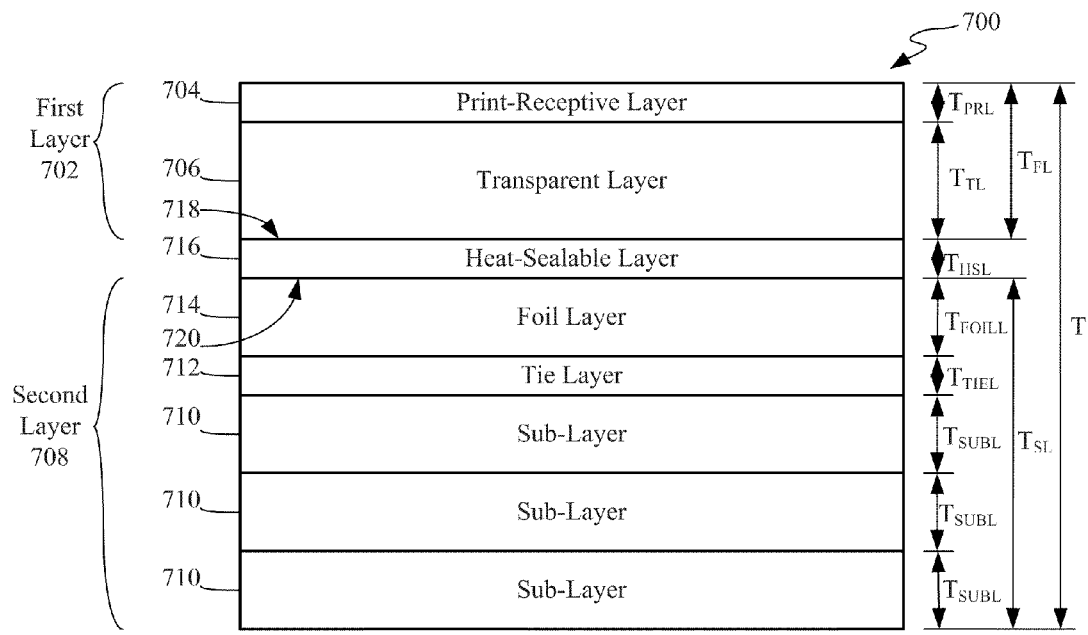
FIG. 7A is a sectional view of a sheet of multilayer material according to another preferred embodiment.

Another embodiment of a multilayer laminate material 700 is shown in sectional view of FIG. 7A. In this embodiment, as was the case in the prior embodiments, the first layer 702 includes a layer of print-receptive material 704 that is coupled to a layer of transparent material 706. The thickness of the layer of print-receptive material ("$T_{PRL}$") and the layer of transparent material ("$T_{TL}$") have been previously discussed.

In the embodiment shown in FIG. 7A, the second layer 708 includes the following: three sub-layers 710, which have been previously discussed (see prior discussion of sub-layers 612) and can be made of film, foil, and/or paper; a tie layer 712, which, for example, can be made of ethylene acrylic acid ("EAA") an ionomer (such as Surlyn®) ethylene methacrylic acid ("EMAA"), ethylene methacrylates ("EMA"), or other such materials known by those ordinarily skilled in the art; and a layer of foil 714, which can be aluminum foil or a metallized film or paper substrate. Within the second layer, the tie layer is coupled between the layer of foil and the three sub-layers of film, foil, and/or paper using, for example, an extrusion lamination process.

Each of the sub-layers 710 can have a thickness ("$T_{SUBL}$") that ranges in value from approximately 5 microns to approximately 50 microns. The thickness of the three sub-layers need not be the same. Also, the tie layer 712 can have a thickness ("$T_{TIEL}$") that ranges in value from approximately 2 microns to approximately 25 microns. The layer of foil 714 can have a thickness ("$T_{FOILL}$") that ranges in value from approximately 0.0001 inch to approximately 0.007 inch. Accordingly, the thickness of the second layer 708 ("$T_{SL}$") can range in value from approximately 10 microns to approximately 150 microns when the second layer includes three sub-layers. In additional embodiments, the second layer is not just limited to including three sub-layers, i.e., the second layer can include less than, or more than, three sub-layers.

In the embodiment shown in FIG. 7A, the sheet of multilayer material 700 includes a layer of heat-sealable material 716 that couples the second surface 718 of the first layer 702 to the second layer's first surface 720. The layer of heat-sealable material is configured to allow for the separation of the first layer from the second layer 708 during manufacturing, as discussed below. The layer of heat-sealable layer can, for example, be made of ethylene acrylic acid ("EAA"), an ionomer (such as Surlyn®), ethylene methacrylic acid ("EMAA"), ethylene methacrylates ("EMA"), or other such materials known to those ordinarily skilled in the art; which have the following characteristics: low melting points, e.g., melting point temperatures below approximately 125° C., low glass transition temperatures, e.g., glass transition temperatures below approximately 85° C., or a combination of both. The mechanism for re-bonding the two layers 702 and 708 without using an adhesive will rely upon low melting points temperatures, low glass transition temperatures, or a combination of both. The thickness of the layer of heat-sealable material ("$T_{HSL}$") can range in value from approximately1 to 20% of the total thickness of the overall multilayer material.

During manufacturing, the sheet of multilayer material 700 shown in FIG. 7A is input to the converter 400, and the converter's print station 404 prints/deposits information on the first layer's print-receptive layer 704. Typically, the information is reverse printed on the first layer's print-receptive layer. Next, the converter separates the first layer 702 from the combination of the layer of heat-sealable material 716 and the second layer 708. Next, the converter flips the orientation 418 of the first layer using the turn bar 408, and then, the converter brings the first layer back together with the combination of layer of heat-sealable material and the second layer, and heat bonds them together to form the configuration 722 shown in the sectional view of FIG. 7B. The heat bonding can be accomplished using, for example, a heated nip or other similar device that is included in the converter. Thus, the first layer is heat bonded to the second layer via the layer of heat-sealable material in the resulting multilayer material.

Figure 7B:
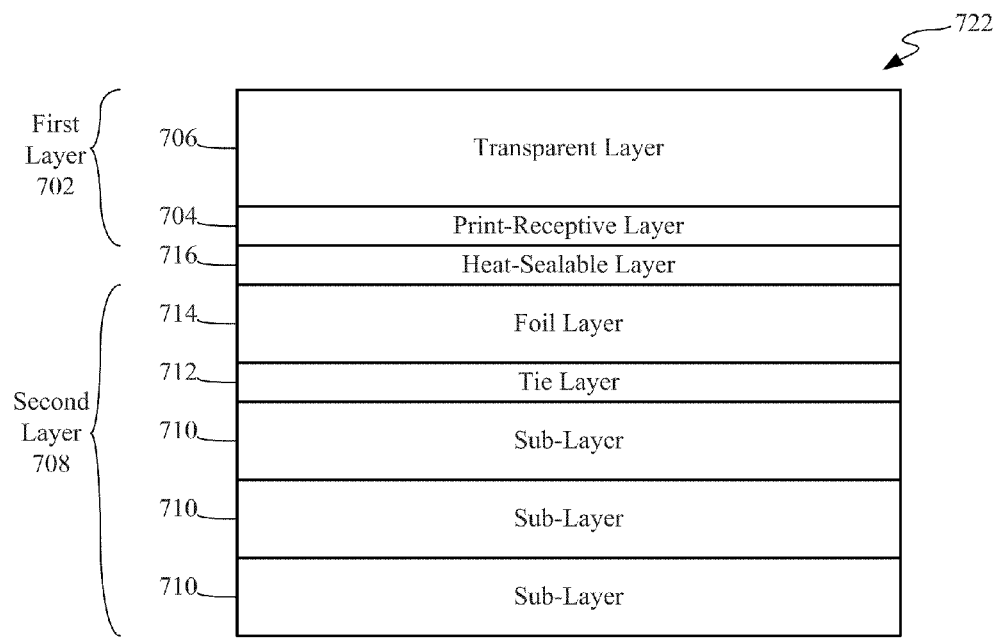
FIG. 7B is a sectional view of a sheet of multilayer material of FIG. 7A after processing by a converting apparatus.

Advantageously, the layer of foil 714 shows through the first layer 702 to produce a visually attractive surface, e.g., a shiny surface, of the embodiment 722 shown in FIG. 7B. The layer of foil advantageously can function as a barrier against the transmission of oxygen and/or moisture, which might be a requirement associated with an item packaged using the multilayer laminated material 722. As previously discussed, a separate layer of laminate need not be applied to the multilayer material after information 406 is printed/deposited on the first layer. Also, all that need be added to the converter 400 is a simple device, e.g., a heated nip that is configured to heat-bond the first and second layers 702 and 708 together via the heat-sealable layer 716. In addition, this embodiment advantageously does not require the use of adhesive lamination.

Figure 8A:
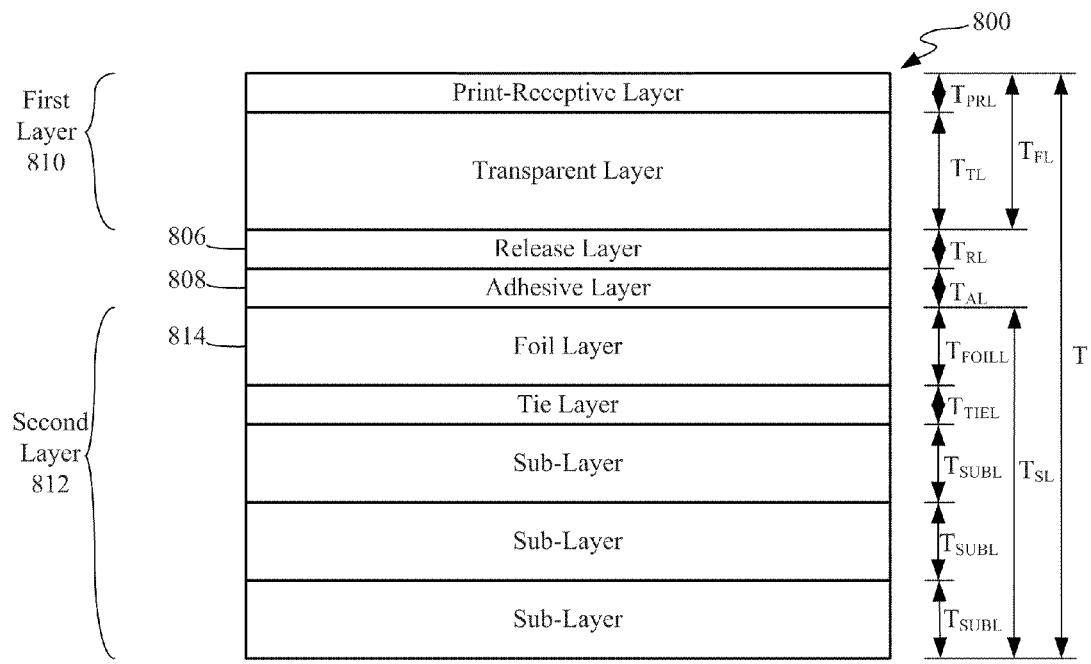
FIG. 8A is a sectional view of a sheet of multilayer material according to another preferred embodiment.
Figure 8B:
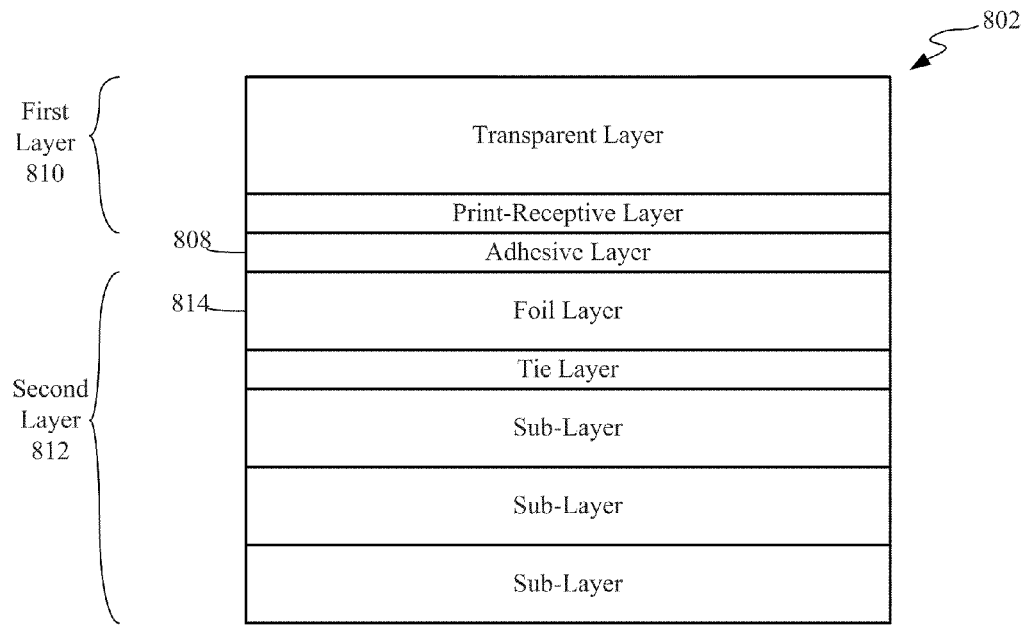
FIG. 8B is a sectional view of a sheet of multilayer material of FIG. 8A after processing by a converting apparatus.

Embodiments of multilayer laminate material 800 and 802, which are analogous to the multilayer laminate material 700 and 722 shown in FIGS. 7A and 7B, respectively, are shown in sectional view of FIGS. 8A and 8B, respectively. In particular, the embodiments of FIGS. 8A and 8B differ from the embodiments of FIGS. 7A and 7B, in that the embodiment 800 of FIG. 8A includes a layer of release material 806 and a layer of adhesive 808 instead of a layer of heat-sealable material 716, as shown in the embodiment of FIG. 7A. Also, the embodiment 802 of FIG. 8B includes a layer of adhesive material instead of a layer of heat-sealable material, as included in the embodiment of FIG. 7B.

FIG. 8A is a sectional view of an example embodiment of multilayer material 800 before it is processed by the converter 400, and FIG. 8B is a sectional view of the same example embodiment 802 after processing by the converter. The thickness of the layer of release material 806 ("$T_{RL}$") can range in value from approximately 0.1 gsm to approximately 1.5 gsm. Also, the thickness of the adhesive layer 808 ("$T_{AL}$") can range in value from approximately 10 gsm to approximately 25 gsm. The converter processes the embodiment shown in FIG. 8A in the same manner as the converter processes the embodiment 700 shown in FIG. 7A, with the only differences being: 1) the converter removes the release layer from the first layer 810 after the converter separates the first and second layers 810 and 812, and 2) the converter couples the first and second layers together using the adhesive layer 800, and does not require that the converter use of a heat nip, as could be used for the embodiment 700 of FIG. 7A. Advantageously, the layer of adhesive material protects the foil layer 814 from oxidation. Without this protective layer, the foil would oxidize within a few hours of production.

Figure 9A:
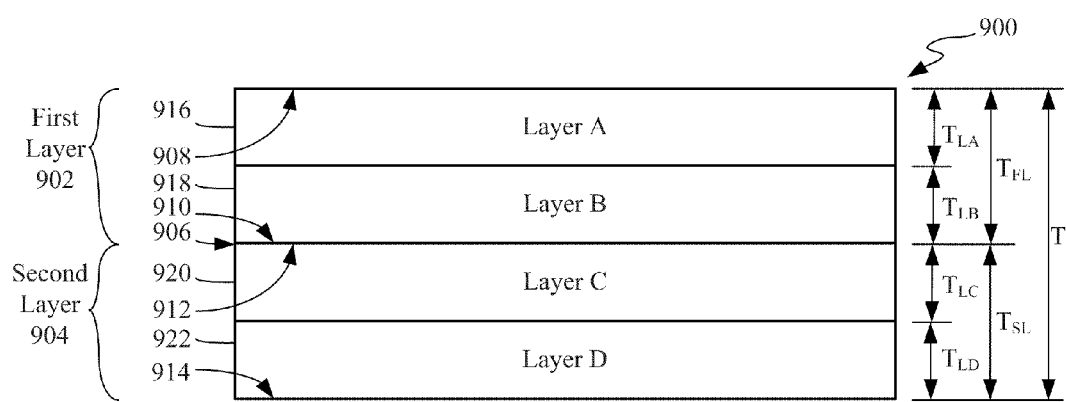
FIG. 9A is a sectional view of a sheet of multilayer material according to another preferred embodiment.

Another example embodiment of a multilayer material 900 is shown in FIG. 9A, which illustrates a sectional view of another multilayer laminate material before it is processed by a converter 400. In this embodiment, the multilayer material is manufactured by co-extruding incompatible films, e.g., an incompatible polymer pairings. The coextrusion process is achieved using conventional film coextrusion equipment.

As shown in FIG. 9A, the first layer 902 is disposed on the second layer 904 with an interface 906 between the first layer and the second layer. The first layer has a first surface 908 and an opposing second surface 910. Similarly, the second layer has a first surface 912 and an opposing second surface 914. The interface is located between the first layer's second surface and the second layer's first surface.

The embodiment of the multilayer material 900 shown in FIG. 9A includes four layers 916-922. In additional analogous embodiments, the multilayer material can include more than four layers. The multilayer material has a first layer 902 that includes layer A 916 and layer B 918, and a second layer 904 that includes layer C 920 and layer D 922. Layer A can be made of various materials including, for example, the previously discussed print-receptive material; and layer B can be made of various materials including, for example, the transparent material that is included in the previously discussed layer of transparent material 318, 608, and 706; layer C can be made of various materials including, for example, a heat seal film; and layer D can be made of various materials including, for example, the material included in the previously discussed film/foil/paper sub-layers 612 and 710 and provide desired barrier properties of gas or oxygen or moisture resistance or impermeability.

The materials used for layers B and C 918 and 920 are specifically selected to be incompatible with one another in such a degree that no lasting mechanical or chemical bond exists between layers B and C. Also, the materials used for layers A and C 916 and 920, layer A and B 916 and 918, and layers C and D 920 and 922 are specifically selected to be compatible with one another. In some embodiments, layer B 918 has a hard, scratch-resistant surface and good clarity, for example, layer B can be made of polypropylene or cyclic olefin copolymer, etc. Layer C 920 includes a material that has a low melting point or low glass transition temperature, for example, layer C can include ethylene vinyl alcohol, aliphatic nylon, or styrene butadiene, etc. Also, layers A and C have enough compatibility to bond under pressure and/or heat. In addition, layer D 922 is distinct from layers A and B to avoid creating blocking problems during extrusion roll formation or upon winding after conversion. Accordingly, in specific embodiments, layers B, C, and D can be the following: polypropylene ("PP"), Surlyn®, Nylon 6, 66, and Nylon 6, respectively; styrene butadiene styrene ("SBS"), ethylene vinyl acetate ("EVA"), PP, and PP, respectively; or ("mPE"), PP, and ethylene vinyl alcohol ("EVOH"), respectively.

With respect to the above, some exemplary constructions include the following layers A/B/C/D:

|   | A | B | C and D |
|---|---|---|---|
| 1 | EMAA (Surlyn ®) | Nylon | Polyethylene |
| 2 | Polyethylene | Polypropylene | EMAA (Surlyn ®) |
| 3 | EVOH | Nylon | Polyethylene |

In each of the examples 1-3 above, layer A is first subjected to reverse printing. Then layers A and B are separated from layer C and D, flipped and combined again with layer C and D to form the final construction (represented in FIG. 9B).

During manufacturing, the multilayer material 900 is input to the converter 400, the converter's print station 404 prints/deposits information 406 on layer A 916, and the converter separates the first layer 902 from the second layer 904. As previously discussed, the chemical make-up of layer B 918 and layer C 920 is such that layers B and C are incompatible, and thus, facilitate easy separation from each other. After the first and second layers are separated, the converter flips the orientation of the first layer using the turn bar 408, and then, the converter reunites the first and second layers together, as shown in the embodiment 924 of FIG. 9B, where the first and second layers are bonded together using, for example, heat and pressure. In specific embodiments, the converter can recouple the first and second layers using a heating nip.

In other embodiments, the converter applies a thin layer, e.g., less than 10 gsm thick, of adhesive over the first layer after the information printed/deposited. The adhesive can be, for example, a polyurethane, acrylic-based material, an epoxy-based adhesive In these embodiments, the adhesive bonds layer A 916 to layer C 920 when the converter 400 reunites the first and second layers 902 and 904 after inverting. Accordingly, there is no need for a heat nip in these embodiments.

Figure 9B:
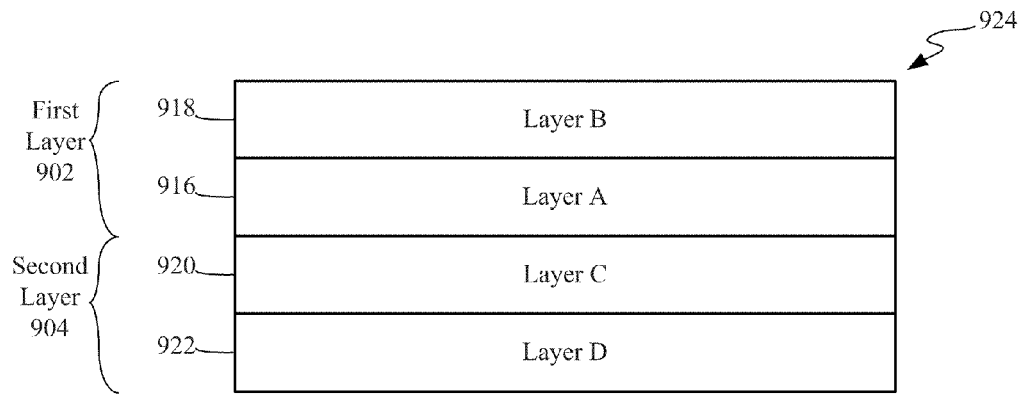
FIG. 9B is a sectional view of a sheet of multilayer material of FIG. 9A after processing by a converting apparatus.

While layer B and C 918 and 920 are incompatible in the embodiment 900 and 924 shown in FIGS. 9A and 9B, in other embodiments, layer B 918 can be a tie layer 712 that bonds layer A 916 to layer C 920, and the incompatibility between layers can exist between layers C and D 920 and 922. Likewise, in other embodiments the incompatability can exist between layers A and B 916 and 918. Accordingly, the multilayer material after processing by the converter 400 can result in various configurations having different sequences of layers.

Advantageously, some of the previously discussed embodiments 900 and 902 that includes layers A, B, C, and D 916-922, where two of the layers are incompatible with one another, remove the need for pressure-sensitive adhesive. Also, the prior embodiments eliminate the need for a separate lamination step, or the need to rely upon costly over-varnishes.

One advantage that is associated with the various embodiments 300, 600, 700, 800, and 900 is that the multilayer laminated material can be processed using converters 400 that have a narrow-format we, generally any printer converter equipment running webs of material 55 inches or less in width, to produce flexible packaging laminate materials for a wide variety of applications and markets. Narrow-format web converters are cheaper to operate and more common than other types of wide web converters. Narrow-format web converters do not have the infrastructure for multiple process steps, so the above embodiments are readily applicable to narrow-format web converters.

Figure 10:
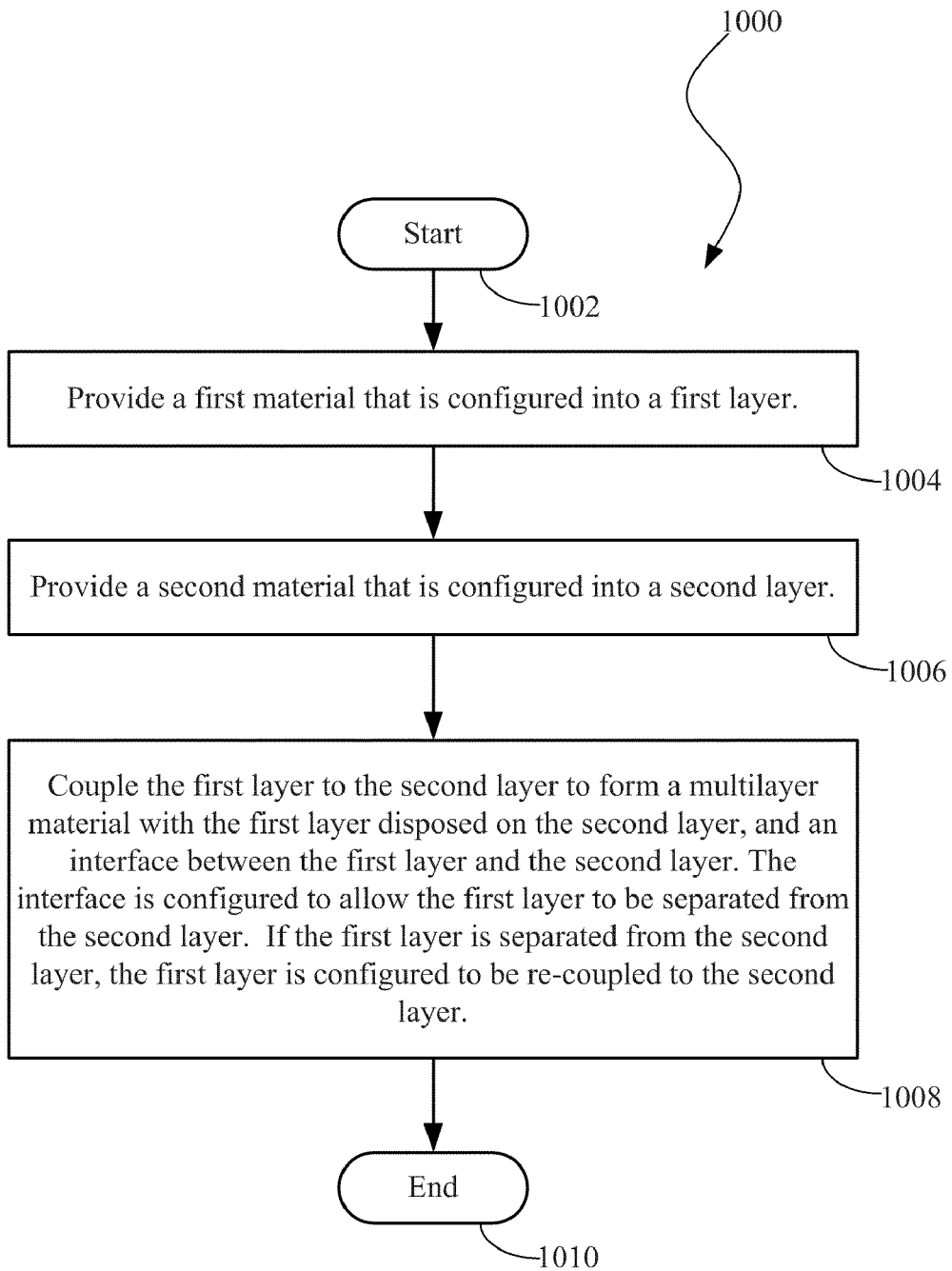
FIG. 10 is a flowchart of an example method for manufacturing a multilayer material according to the invention.

Referring additionally to FIG. 10, an exemplary method for manufacturing a multilayer material 300, 600, 700, 800, and 900 according to the present invention is illustrated in algorithm 1000. After starting the method at step 1002, the next step 1004 is to provide a first material in the form of a first layer 302, 604, 702, 810, and 902. Next, at step 1006, a second material that is configured into a second layer 304, 610, 708, 812, and 904 is provided. At step 1008, the first and second layers are coupled to form the multilayer material with the first layer disposed on the second layer with an interface 314 and 906 between the first layer and the second layer. The interface is configured to allow the first layer to be separated from the second layer. If the first layer is separated from the second layer, the first layer is configured to be re-coupled to the second layer. The method ends at step 1010.

Figure 11:
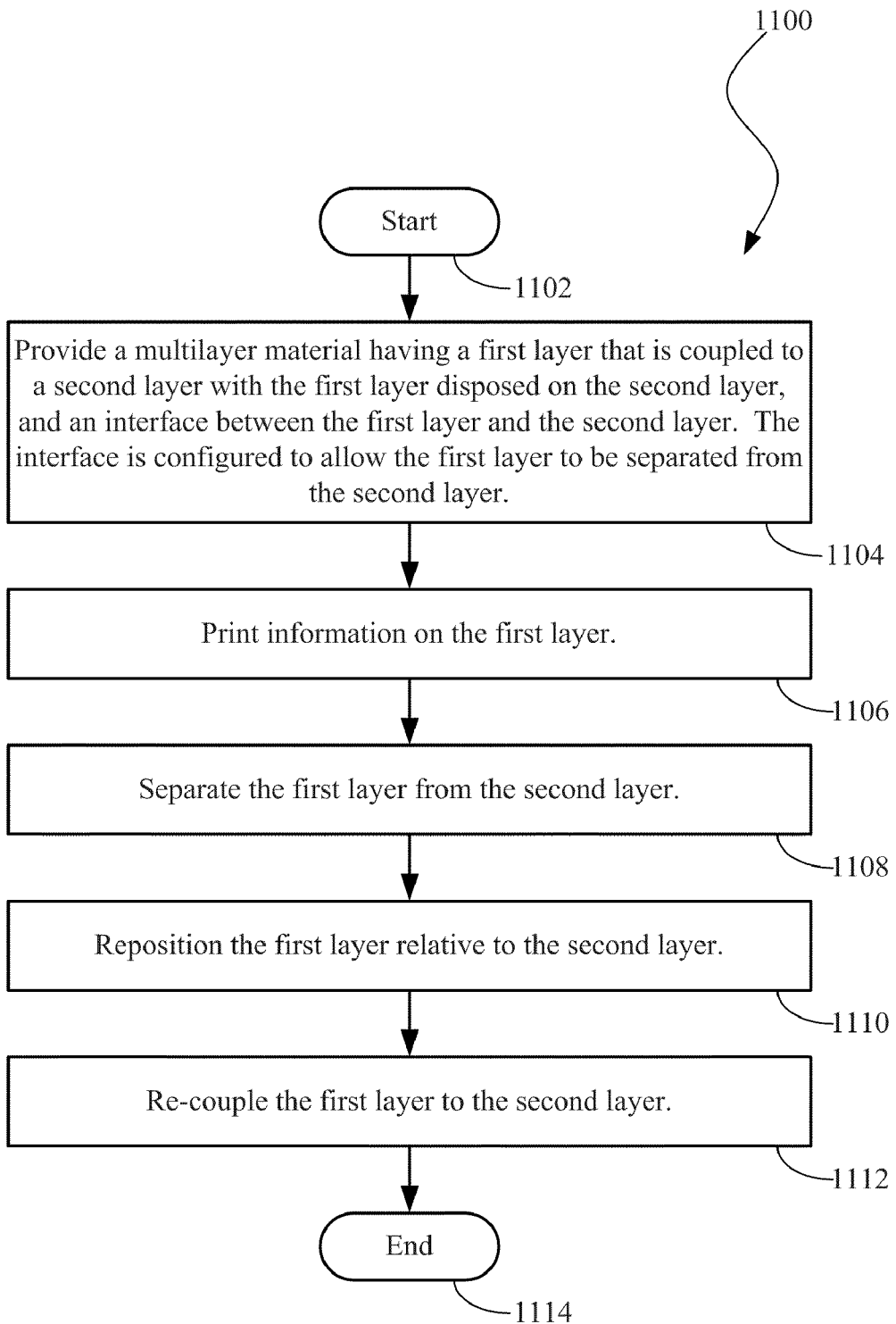
FIG. 11 is a flowchart of an example method for configuring a multilayer material according to the invention.

Referring additionally to FIG. 11, an exemplary method for configuring a multilayer material 402, 722, 802, and 924 that includes a first layer 302, 604, 702, 810, and 902 coupled to a second layer 304, 610, 708, 812, and 904 according to the present invention is illustrated in algorithm 1100. After starting the method at step 1102, the next step 1104 is to provide the multilayer material 300, 600, 700, 800, and 900, which has the first layer coupled to the second layer with the first layer disposed on the second layer, and an interface 314 and 906 between the first layer and the second layer. The interface is configured to allow the first layer to be separated from the second layer. At step 1106, information is printed on the first layer. Next, at step 1108, the first layer is separated from the second layer. At step 1110, the first layer is repositioned relative to the second layer. Next, at step 1112, the first layer is re-coupled to the second layer. The method ends at step 1114.

While the thicknesses of all of the layers shown in the previously discussed figures are shown having uniform thickness, this need not be the case. In fact, the thickness of the various layers of material that are included in the embodiment sheets of multilayer material 300, 600, 700, 800, and 900 can vary due to various factors including, for example, the tolerances that are associated with the manufacturing of the layers of the multilayer material.

All of the features disclosed in the specification, including the claims, abstract, and drawings, and all of the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise. Thus, unless expressly stated otherwise, each feature disclosed is one example only of a generic series of equivalent or similar features.

The foregoing detailed description of the present invention is provided for purposes of illustration, and it is not intended to be exhaustive or to limit the invention to the particular embodiments disclosed. The embodiments may provide different capabilities and benefits, depending on the configuration used to implement the key features of the invention. Accordingly, the scope of the invention is defined only by the following claims.

What is claimed:

1. A multilayer material comprising:
   a first layer;
   a second layer that is coupled to the first layer with the first layer disposed on the second layer, and an interface between the first layer and the second layer;
   wherein the interface is configured to allow the first layer to be separated from the second layer, and
   the first layer, after separation from the second layer, is configured to be repositioned and re-coupled to the second layer.

2. The multilayer material according to claim 1, wherein a permanent bond is formed between the first layer and the second layer after the first layer is re-coupled to the second layer.

3. The multilayer material according to claim 1, wherein the first layer is at least partially transparent.

4. The multilayer material according to claim 1, wherein the first layer includes a layer of a print-receptive material and a layer of a transparent material.

5. The multilayer material according to claim 1, wherein the layer of print-receptive material is receptive to printing by a commercially available print method selected from the group consisting of rotogravure, offset lithography, flexography, letterpress, screen, inkjet, and laser, using an ink selected from the group consisting of water-based, solvent, UV, and toner-based.

6. The multilayer material according to claim 1, wherein
the print-receptive material selected from the group consisting of inherently printable polymer films, energy treated polymer films, and printable topcoats; and
the layer of the print-receptive material has a thickness value from approximately 10 microns to approximately 50 microns.

7. The multilayer material according to claim 1, wherein the transparent material is selected from the group consisting of polyethylene terephthalate ("PET"), biaxially oriented polypropylene ("BOPP"), high density polyethylene ("HDPE"), low density polyethylene ("LDPE"), linear low density polyethylene ("LLDPE"), metallocene polyethylene ("mPE"), polystyrene, polycarbonate, polylactic acid ("PLA"), biaxially oriented nylon ("BON"), ethylene acrylic acid ("EAA"), ethylene vinyl acetate ("EVA"), ethylene methacrylates ("EMA"), and other such materials known to those ordinarily skilled in the art; and
the layer of the transparent material has a thickness value from approximately 5 microns to approximately 50 microns.

8. The multilayer material according to claim 1, wherein
the second layer includes at least one sub-layer of a material selected from the group consisting of film, foil, and paper; and
the at least one sub-layer of the material has a thickness value from approximately 5 microns to approximately 50 microns.

9. The multilayer material according to claim 1, wherein
the second layer includes at least two sub-layers of material; and
the at least two sub-layers are coupled together with an adhesive.

10. The multilayer material according to claim 1, further comprising a layer of adhesive that is coupled between the first layer and the second layer.

11. The multilayer material according to claim 10, wherein
the layer of adhesive includes a pressure-sensitive adhesive selected from the group consisting of rubber-based hot melt adhesives, elastomer-based hot melt adhesives, acrylic hot melt adhesives, solvent adhesives, emulsion adhesives, silicone adhesives, temperature activated adhesives, light activated adhesives, moisture activated adhesives, actinic radiation activated adhesives UV activated adhesives, epoxidic adhesives, and urethane adhesives; and
the layer of pressure-sensitive adhesive has a thickness value from approximately 10 gsm to approximately 25 gsm.

12. The multilayer material according to claim 1, wherein the second layer includes a layer selected from the group consisting of a layer of foil and a layer of tie material.

13. The multilayer material according to claim 1, further comprising a layer of a heat-sealable material that is coupled between the first layer and the second layer.

14. The multilayer material according to claim 13, wherein
the heat-sealable material is selected from the group consisting of ethylene acrylic acid ("EAA") ionomers, Surlyn®, ethylene vinyl acetate ("EVA"), ethylene methacrylic acid ("EMAA"), ethylene methacrylates ("EMA"), anhydride-modified linear low density polyethylene, and other such materials well known to those ordinarily skilled in the art; and
the layer of the heat-sealable material has a thickness value from approximately 2 microns to approximately 50 microns.

15. The multilayer material according to claim 1, wherein the multilayer material is a packaging material that is configured to be used for packaging an item selected from the group consisting of food, snacks, medical goods and equipment, and other consumer and industrial goods.

16. A multilayer material comprising:
a first layer having a first surface and an opposing second surface; and
a second layer having a first surface and a second surface wherein the first surface is coupled to the first layer's second surface with the first layer disposed on the second layer, and an interface between the second layer's surface and the first layer's second surface;
wherein the interface is configured to allow the first layer to be separated from the second layer, and
if the first layer is separated from the second layer, the first layer is configured to be repositioned and re-coupled to the second layer so the first layer's first surface is coupled to the second layer's surface.

17. The multilayer material according to claim 16, wherein:
the first layer includes at least two layers; and
the second layer includes at least two layers;
wherein, before the first layer is separated from the second layer, a one layer of the first layer's at least two layers is incompatible with and coupled to a one layer of the second layer's at least two layers.

18. The multilayer material according to claim 17, wherein
a one of the first layer's at least two layers is made of a first material selected from the group consisting of polyethylene polymers and copolymers, ionomer, styrene butadiene styrene ("SBS"), ethylene vinyl acetate ("EVA"), metallocene polyethylene ("mPE"), and polyesters; and
a one of the second layer's at least two layers is made of a second material selected from the group consisting of Nylon 6,66, Nylon 6, polypropylene ("PP"), and ethylene vinyl alcohol ("EVOH").

19. The multilayer material according to claim 16, wherein the first layer includes at least two layers which are joined to form a construction having a print surface and a non-print surface adjacent to the second layer of material wherein the layer having the non-print surface is of a material which allows the non-print surface to be separated from the second layer of material.

20. The multilayer film of claim 19 wherein the layer having the print surface is made of a material selected from LLDPE (metallocene catalyzed or Ziegler-Natta), EVA, EMA, EAA, EMAA, Ionomers, EEA or ULDPE.

21. The multilayer film of claim 19 wherein the layer having the non-print surface is made of a material selected from Acrylonitrile-Butadiene-Styrene (ABS), Polyester (PET), unmodified Polymethylmethacrylate (PMMA or acrylic), unmodified Polystyrene (PS), Homopolymer Polypropylene (HPP), Ethylene Vinyl Alcohol (EVOH), Styrene-Acrylonitrile (SAN), Methyl Pentene Copolymer, Polycarbonate (PC), Styrene-Butadiene Copolymers, and fluorocarbons.

22. The multilayer film of claim 19 wherein the material of the second layer is selected from Ethylene Acrylic Acid (EAA), Ethylene-Methacrylic Acid Copolymers (EMAA) and Ethylene-Methacrylic Acid Salts (Ionomers).

23. The multilayer material according to claim 16, wherein the first layer is at least partially transparent and includes a layer of a print-receptive material and a layer of a transparent material.

24. The multilayer material according to claim 16, wherein the second layer includes at least one sub-layer of a material selected from the group consisting of film, foil, and paper.

25. The multilayer material according claim 16, further comprising a layer of adhesive that is coupled between the first layer and the second layer.

26. The multilayer material according to claim 16, further comprising a layer of a heat-sealable material that is coupled between the first layer and the second layer.

27. A method for manufacturing a multilayer material, the method comprising:
providing a first material that is configured into a first layer;
providing a second material that is configured into a second layer; and
coupling the first layer to the second layer to form the multilayer material with the first layer disposed on the second layer, and an interface between the first layer and the second layer;
wherein the interface is configured to allow the first layer to be separated from the second layer, and
if the first layer is separated from the second layer, the first layer is configured to be repositioned and re-coupled with the second layer.

28. A method for configuring a multilayer material that includes a first layer and a second layer that is coupled to the first layer with the first layer disposed on the second layer, and an interface between the first layer and the second layer, wherein the interface is configured to allow the first layer to be separated from the second layer, the method comprising:
providing the multilayer material;
separating the first layer from the second layer;
repositioning the first layer relative to the second layer; and
re-coupling the first layer to the second layer.

29. The method according to claim 28, further comprising printing information on the first layer before the first layer is separated from the second layer.

30. The method according to claim 28, wherein the step of repositioning the first layer relative to the second layer includes flipping the first layer.

31. The method according to claim 28, wherein the step of repositioning the first layer relative to the second layer is accomplished using a turn bar.

32. The method according to claim 28, wherein the steps of separating the first layer from the second layer, repositioning the first layer relative to the second layer, and re-coupling the first layer to the second layer are accomplished using a converter.

* * * * *